United States Patent
Lu et al.

(10) Patent No.: US 11,140,334 B1
(45) Date of Patent: Oct. 5, 2021

(54) 940NM LED FLASH SYNCHRONIZATION FOR DMS AND OMS

(71) Applicant: Ambarella International LP, Santa Clara, CA (US)

(72) Inventors: Yao Lu, Shanghai (CN); Long Zhao, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 16/860,648

(22) Filed: Apr. 28, 2020

(30) Foreign Application Priority Data

Apr. 21, 2020 (CN) .......................... 202010317826.6

(51) Int. Cl.
*H04N 5/235* (2006.01)
*H04N 5/225* (2006.01)
*H04N 7/18* (2006.01)
*G06T 7/00* (2017.01)

(52) U.S. Cl.
CPC ......... *H04N 5/2354* (2013.01); *H04N 5/2256* (2013.01); *H04N 7/18* (2013.01); *G06T 7/00* (2013.01)

(58) Field of Classification Search
CPC ....... H04N 5/2354; H04N 7/18; H04N 5/2256
See application file for complete search history.

(56) References Cited

U.S. PATENT DOCUMENTS

| | | | | |
|---|---|---|---|---|
| 5,670,778 | A  * | 9/1997 | Smith | G01V 8/22 |
| | | | | 250/221 |
| 2012/0194650 | A1* | 8/2012 | Izadi | H04N 5/332 |
| | | | | 348/47 |
| 2017/0289422 | A1* | 10/2017 | Shih | H04N 5/2256 |
| 2018/0215233 | A1* | 8/2018 | Neveu | B60H 1/00742 |
| 2019/0364229 | A1* | 11/2019 | Stec | H04N 5/3532 |
| 2020/0249428 | A1* | 8/2020 | Sugiyama | H04N 5/2254 |
| 2020/0281463 | A1* | 9/2020 | Rydberg | H04N 5/2258 |

* cited by examiner

*Primary Examiner* — Nasim N Nirjhar
(74) *Attorney, Agent, or Firm* — Christopher P. Maiorana, PC

(57) ABSTRACT

An apparatus includes a first image sensor, a second image sensor, a first light source associated with the first image sensor, a second light source associated with the second image sensor, and a control circuit. The control circuit may be configured to control the first light source and the second light source to prevent interference between the first and the second light sources affecting images captured by the first and the second image sensors.

20 Claims, 16 Drawing Sheets

940NM LED FLASH SYNCHRONIZATION FOR DMS AND OMS

This application relates to Chinese Application No. 202010317826.6, filed Apr. 21, 2020, which is incorporated by reference in its entirety.

FIELD OF THE INVENTION

The invention relates to vehicle monitoring systems generally and, more particularly, to a method and/or apparatus for implementing 940 nm LED flash synchronization for a driver monitoring system (DMS) and an occupant monitoring system (OMS).

BACKGROUND

An in-cabin safety system generally utilizes a driver monitoring system (DMS) and an occupant monitoring system (OMS). The driver monitoring system generally includes a camera directed toward the driver's face, which provides a real-time evaluation of the presence and the state of the driver. The occupant monitoring system generally includes one or more cameras directed toward passengers to provide understanding of passenger condition and even to provide a tailored environment specific to an identified occupant.

The DMS uses a monochrome global shutter sensor with a light emitting diode (LED) flash. The LED flash needs to be synchronized with a shutter time of the DMS camera to maintain low average power, which is beneficial for both human vision health and thermal considerations. The OMS uses a rolling shutter RGBIR sensor with a LED light source. A 940 nanometer (nm) LED light source is preferred because 850 nm light is visible for humans. When the DMS and the OMS both use 940 nm LED light sources, the LED units can interfere with each other, which can lead to vision algorithm failure. Because of the interference, the DMS and OMS units need to be arranged carefully in the vehicle cabin, to ensure the LED units point in different directions, which is inconvenient, or impossible sometimes.

It would be desirable to implement 940 nm LED flash synchronization for a driver monitoring system (DMS) and an occupant monitoring system (OMS).

SUMMARY

The invention encompasses an aspect concerning an apparatus comprising a first image sensor, a second image sensor, a first light source associated with the first image sensor, a second light source associated with the second image sensor, and a control circuit. The control circuit may be configured to control the first light source and the second light source to prevent interference between the first and the second light sources affecting images captured by the first and the second image sensors.

In some embodiments of the apparatus aspect described above, the first image sensor comprises a monochrome global shutter complementary metal oxide semiconductor (CMOS) sensor and the second image sensor comprises an RGBIR rolling shutter CMOS sensor.

In some embodiments of the apparatus aspect described above, the first and the second light sources comprise one or more light emitting diodes. In some embodiments where the first and the second light sources comprise one or more light emitting diodes, the first and the second light sources comprise one or more 940 nm near infrared light emitting diodes.

In some embodiments of the apparatus aspect described above, the apparatus further comprises an image signal processing circuit configured to analyze images captured by the first and the second image sensors. In some embodiments comprising an image signal processing circuit, the image signal processing circuit is further configured to generate one or more control signals in response to analyzing the images captured by the first and the second image sensors, and one or more systems of a vehicle are controlled in response to the one or more control signals.

In some embodiments of the apparatus aspect described above, the apparatus further comprises a first image signal processing circuit configured to analyze images captured by the first image sensor, and a second image signal processing circuit configured to analyze images captured by the second image sensor. In some embodiments comprising first and second image signal processing circuits, the first image signal processing circuit is further configured to generate one or more first control signals in response to analyzing the images captured by the first image sensor, the second image signal processing circuit is further configured to generate one or more second control signals in response to analyzing the images captured by the second image sensor, one or more occupant-related systems of a vehicle are controlled in response to the one or more first control signals, and one or more driver-related systems of the vehicle are controlled in response to the one or more second control signals.

In some embodiments of the apparatus aspect described above, the control circuit is configured to control respective flashes of the first and the second light sources. In some embodiments, in a first mode, the first light source is configured to generate a flash in response to a first trigger signal and the second light source is configured to generate a flash in response to a second trigger signal, and in a second mode, the first light source is continuously on and the second light source is configured to generate a flash in response to the second trigger signal.

The invention also encompasses an aspect concerning a method of monitoring a passenger compartment of a vehicle comprising the steps of monitoring a driver of the vehicle using a first image sensor and an associated first light source, monitoring occupants of the vehicle using a second image sensor and an associated second light source, and controlling the first light source and the second light source to prevent interference between the first and the second light sources affecting images captured by the first and the second image sensors.

In some embodiments of the method aspect described above, the first image sensor comprises a monochrome global shutter complementary metal oxide semiconductor (CMOS) sensor and the second image sensor comprises an RGBIR rolling shutter CMOS sensor.

In some embodiments of the method aspect described above, the first and the second light sources comprise one or more light emitting diodes. In some embodiments comprising light emitting diodes, the first and the second light sources comprise one or more 940 nm near infrared light emitting diodes.

In some embodiments of the method aspect described above, the method further comprises analyzing images captured by the first and the second image sensors using a multi-channel image signal processing circuit. In some embodiments comprising analyzing images captured by the first and the second image sensors, the method further comprises generating one or more control signals in response to analyzing the images captured by the first and the second image sensors and controlling one or more systems of a vehicle in response to the one or more control signals.

In some embodiments of the method aspect described above, the method further comprises analyzing images captured by the first image sensor using a first image signal processing circuit and analyzing images captured by the second image sensor using a second image signal processing circuit. In some embodiments using first and second image signal processing circuits, the method further comprises generating one or more first control signals in response to analyzing the images captured by the first image sensor, generating one or more second control signals in response to analyzing the images captured by the second image sensor, controlling one or more driver-related systems of a vehicle in response to the one or more first control signals, and controlling one or more occupant-related systems of the vehicle in response to the one or more second control signals.

In some embodiments of the method aspect described above, the method further comprises in a first mode, generating a first flash using the first light source in response to a first trigger signal and generating a second flash using the second light source in response to a second trigger signal, where the first and the second flash are synchronized, and in a second mode, using the second light source to continuously generate near infrared illumination and using the first light source to generate a flash in response to the first trigger signal. In some embodiments implementing a first and a second mode, in the first mode, the first flash and the second flash are generated during an integration period of all rows of the second image sensor, and in the second mode, the flash is generated when none of the rows of the second image sensor are in the integration period.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing 940 nm LED flash synchronization for a driver monitoring system (DMS) and an occupant monitoring system (OMS) that may (i) achieve flash synchronization of multiple 940 nm DMS and OMS cameras, (ii) eliminate 940 nm near infrared (NIR) interference between cameras, (iii) connect multiple cameras to a single image signal processing (ISP) circuit, (iv) synchronize multiple ISP circuits, (v) place a near infrared (NIR) pulse in a designated timing slot to avoid interference, (vi) provide low power consumption for 940 nm LED of OMC cameras, and/or (vii) be implemented as one or more integrated circuits.

In various embodiments, a central control mechanism may be implemented to achieve synchronization of multiple 940 nm DMS+OMS cameras. The central control mechanism may eliminate 940 nm near infrared (NIR) interference. In an example, a DMS camera may be in slave mode and one or more OMS cameras may be in either slave or master mode. In an example, all cameras may be connected to channels of a single image signal processor (ISP) frontend. In another example, each camera may be connected to a respective ISP frontend and the ISP frontends may be synchronized by the central control mechanism. In an example, a NIR flash pulse may be placed in a designated timing slot to avoid interference.

Figure 1:
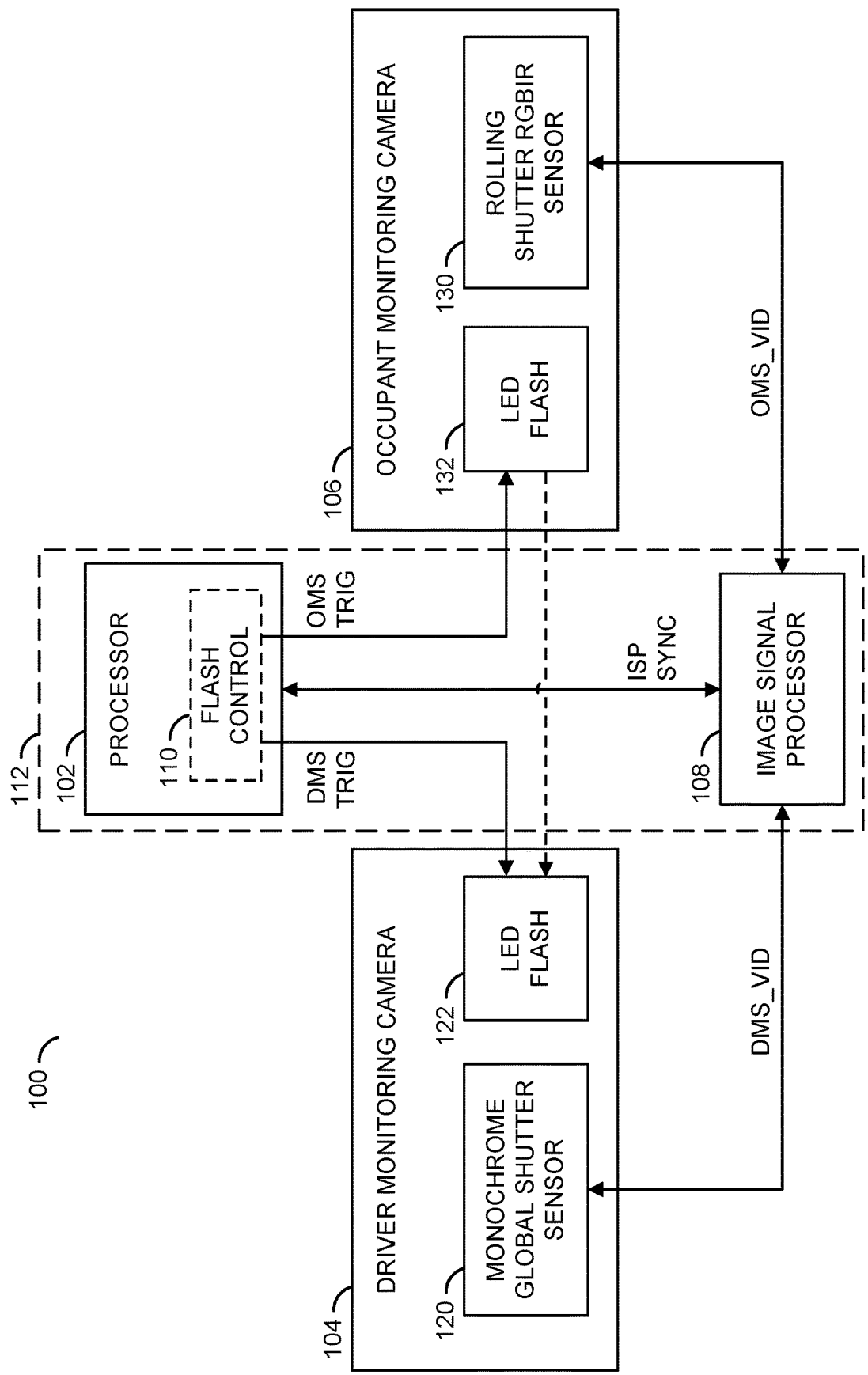
FIG. 1 is a diagram illustrating a driver and occupant monitoring system in accordance with an example embodiment of the invention.

Referring to FIG. 1, a block diagram of an apparatus is shown illustrating an example implementation of a driver and occupant monitoring system in accordance with an example embodiment of the invention. In an example, a driver and occupant monitoring system 100 may implement a multi-channel driver monitoring system, occupant monitoring system, and digital video recorder (DMS+OMS+DVR) solution that may be utilized in automotive applications. In an example, the driver and occupant monitoring system 100 may provide an in-cabin solution. In an example, the driver and occupant monitoring system 100 may comprise a block (or circuit) 102, a block (or circuit) 104, a block (or circuit) 106, and/or a block (or circuit) 108. The circuit 102 may be implemented as a control circuit (e.g., dedicated circuitry, embedded controller, processor, microprocessor, etc.). The circuit 104 may implement a driver monitoring sensor (DMS) or camera module. The circuit 106 may implement an occupant monitoring sensor (OMS) or camera module. The circuit 108 may implement an image signal processing (ISP) circuit (or processor or frontend). In an example, the circuit 108 is generally capable of performing multiple channel ISP. In an example, the circuit 102 may include a block (or circuit) 110. The block 110 may implement a flash control circuit (or function). In another example, the circuits 102 and 110 may be implemented as separate circuit cores than may be instantiated on a single integrated circuit substrate (or die) or in a multi chip module (MCM). In an example, the circuits 102 and 108 (an the circuit 110 when separate from the circuit 102) may be implement in a single integrated circuit or system-on-chip (SOC) 112.

In various embodiments, the circuit 102 is connected to the DMS module 104, the OMS module 106, and the ISP circuit 108. The DMS module 104 and the OMS module 106 are connected to the ISP circuit 108. In an example, the circuit 102 generally provides a central control mechanism to synchronize timing of the DMS module 104 and the OMS module 106. In an example, the circuit 102 may be configured to calculate and maintain a predefined timing model to control sensors and light emitting diode (LED) light sources of the DMS module 104 and the OMS module 106. In an example. the circuit 102 may be further configured to control the ISP circuit 108 for synchronization with the outputs of the DMS module 104 and the OMS module 106. In some embodiments, the circuit 106 may be configured to present a signal (e.g., a last row start to exposure trigger), represented by a dashed line. The signal from the circuit 106 may be utilized to control the circuit 104. In an example, the last row start to exposure trigger signal may reduce timing control effort of the system 100.

In an example, the circuit 102 may have a first output that may present a signal (e.g., DMS_TRIG), a second output that may present a signal (e.g., OMS_TRIG), and an input/output that may communicate with a first input/output of the circuit 108 (e.g., via a signal ISP_SYNC). In an example, the circuit 104 may have an input that may receive the signal DMS_TRIG and an input/output that may communicate with a second input/output of the circuit 108. In an example, the circuit 104 may present a signal (e.g., DMS_VID) to the circuit 108. In an example, the signal DMS_VID may communicate video information from the circuit 104 to the circuit 108. In an example, the circuits 104 and 108 may also exchange control and/or status signals via the connection carrying the signal DMS_VID.

In an example, the circuit 106 may have an input that may receive the signal OMS_TRIG and an input/output that may communicate with a third input/output of the circuit 108. In an example, the circuit 106 may present a signal (e.g., OMS_VID) to the circuit 108. In an example, the signal OMS_VID may communicate video information to the circuit 108. In an example, the circuits 106 and 108 may also exchange control and/or status signals via the connection carrying the signal OMS_VID. In an example, the circuits 104 and 106 may be connected to separate channels of the circuit 108.

In an example, the circuit 110 may be configured to generate the signals DMS_TRIG and OMS_TRIG. The circuit 110 may implement a flash control timing protocol in accordance with embodiments of the invention (described below in connection with FIGS. 8-15). In an example, the circuit 110 may be implemented in hardware, software (or firmware, microcoding, etc.), or a combination of hardware and software.

In an example, the circuit 104 may comprise a block (or circuit) 120 and a block (or circuit) 122. In an example, the circuit 120 may be implemented as a monochrome global shutter image sensor. In an example, the circuit 120 may be implemented as a monochrome global shutter complementary metal oxide semiconductor (CMOS) image sensor. The circuit 122 may implement a near infrared (NIR) light source. In an example, the circuit 122 may be implement with one or more light emitting diodes (LEDs). In various embodiments, the one or more LEDs of the circuit 122 may be configured to emit light with a wavelength of approximately 940 nanometers (nm). In an example, the circuit 122 may be configured to emit flashes of light in response to the signal DMS_TRIG. In an example, a width and/or intensity of the flashes emitted by the circuit 122 may be controlled by the circuit 102. In an example, the circuit 102 may configure the circuit 122 prior to asserting the signal DMS_TRIG. In an example, the circuit 120 may be configured to generate the signal DMS_VID.

In an example, the circuit 106 may comprise a block (or circuit) 130 and a block (or circuit) 132. In an example, the circuit 130 may be implemented as a rolling shutter image sensor. In an example, the circuit 130 may be implemented as an RGBIR rolling shutter CMOS image sensor. The circuit 132 may implement a near infrared (NIR) light source. In an example, the circuit 132 may be implement with one or more light emitting diodes (LEDs). In various embodiments, the one or more LEDs of the circuit 132 may be configured to emit light with a wavelength of approximately 940 nm. In an example, the circuit 132 may be configured to emit light in response to the signal OMS_TRIG. In an example, the circuit 102 may configure the circuit 132 to emit flashes of light in response to the signal OMS_TRIG being asserted. In an example, a width and/or intensity of the flashes emitted by the circuit 132 may be controlled by the circuit 102. In an example, the circuit 102 may configure the circuit 132 prior to asserting the signal OMS_TRIG. In another example, the circuit 132 may be configured to emit light continuously (e.g., by continuously asserting the signal OMS_TRIG). In an example, the circuit 120 may be configured to generate the signal OMS_VID.

Figure 2:
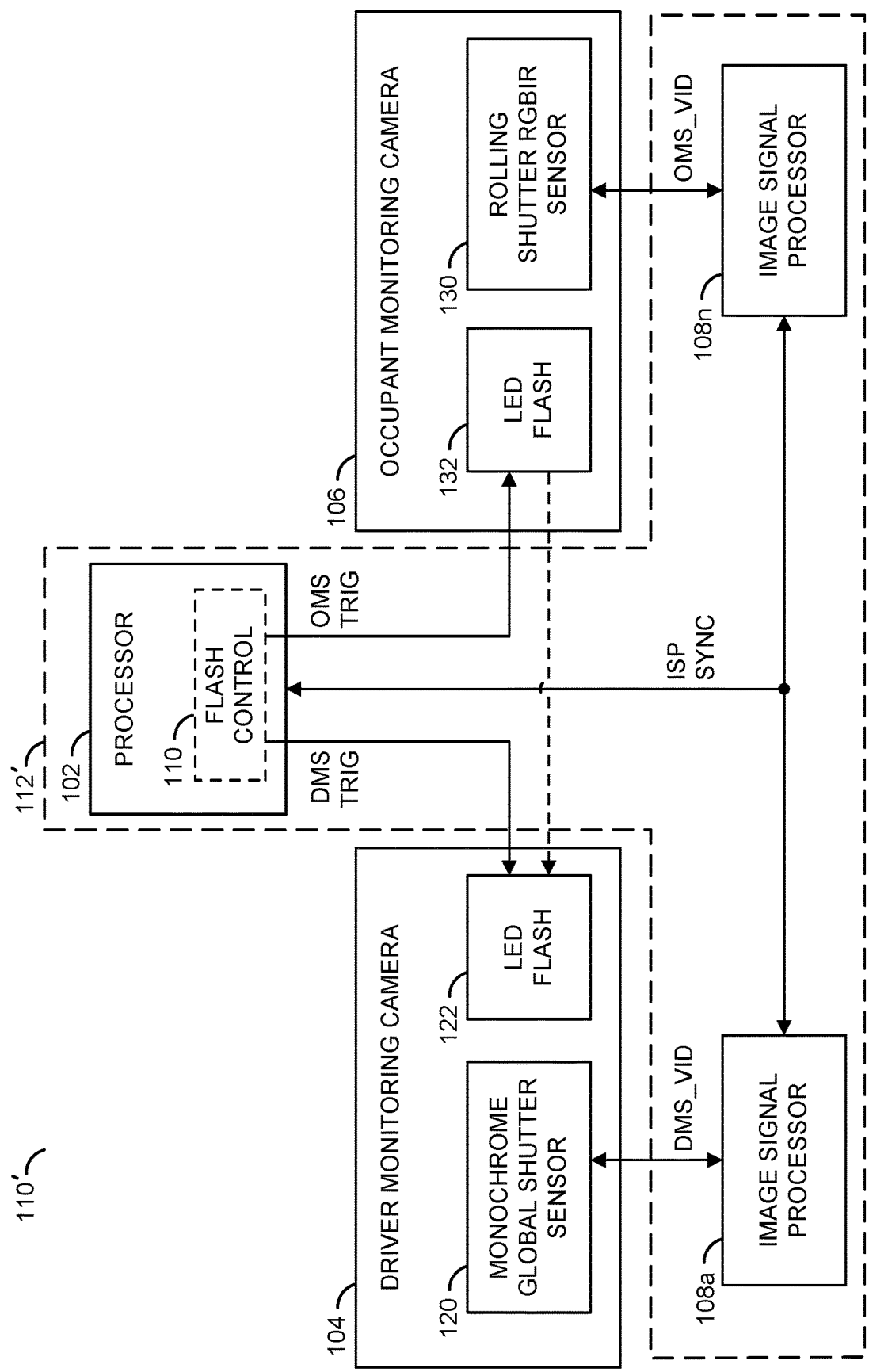
FIG. 2 is a diagram illustrating a driver and occupant monitoring system in accordance with another example embodiment of the invention.

Referring to FIG. 2, a block diagram of an apparatus is shown illustrating another example implementation of a driver and occupant monitoring system in accordance with an example embodiment of the invention. In an example, a driver and occupant monitoring system 100' may implement a multi-channel DMS+OMS+DVR solution that may be utilized in automotive applications. In an example, the driver and occupant monitoring system 100' may provide an in-cabin solution. In an example, the driver and occupant monitoring system 100' may be implemented similarly to the system 100, except that multiple ISP circuits (e.g., 108a-108n) may be implemented. In an example, the circuits 102 and 108a-108n may be implement in a single integrated circuit or system-on-chip (SOC) 112'.

In various embodiments, the circuit 102 may be connected to the DMS module 104, the OMS module 106, and the ISP circuits 108a-108n. In an example, the DMS module 104 may be connected to the circuit 108a and the OMS module 106 may be connected to the ISP circuit 108n. In an example, the circuit 102 generally provides a central control mechanism to synchronize timing of the DMS module 104 and the OMS module 106. In an example, the circuit 102 may be configured to calculate and maintain a predefined timing model to control sensors and light emitting diode (LED) light sources of the DMS module 104 and the OMS module 106. In an example. the circuit 102 may be further configured to control the ISP circuits 108a-108n for synchronization with the outputs of the DMS module 104 and the OMS module 106. In some embodiments, the circuit 106 may be configured to present a signal (e.g., a last row start to exposure trigger), represented by a dashed line, to control the circuit 104. In an example, the last row start to exposure trigger signal may reduce timing control effort.

In an example, the circuit 102 may have a first output that may present the signal DMS_TRIG, a second output that may present the signal OMS_TRIG, and an input/output that may communicate with a first input/output of each of the circuits 108a-108n (e.g., via a signal or signals ISP_SYNC). In an example, the circuit 104 may have an input that may receive the signal DMS_TRIG and an input/output that may communicate with a second input/output of the circuit 108a. In an example, the circuit 104 may present the signal DMS_VID to the circuit 108a. In an example, the signal DMS_VID may communicate video information from the circuit 104 to the circuit 108a. In an example, the circuit 106 may have an input that may receive the signal OMS_TRIG and an input/output that may communicate with a second input/output of the circuit 108n. In an example, the circuit 106 may present the signal OMS_VID to the circuit 108n. In an example, the signal OMS_VID may communicate video information to the circuit 108n. In an example, the circuits 104 and 106 may also exchange control and/or status signals withe the circuits 108a and 108n, respectively, via the connections carrying the signals DMS_VID and OMS_VID, respectively.

Figure 3:
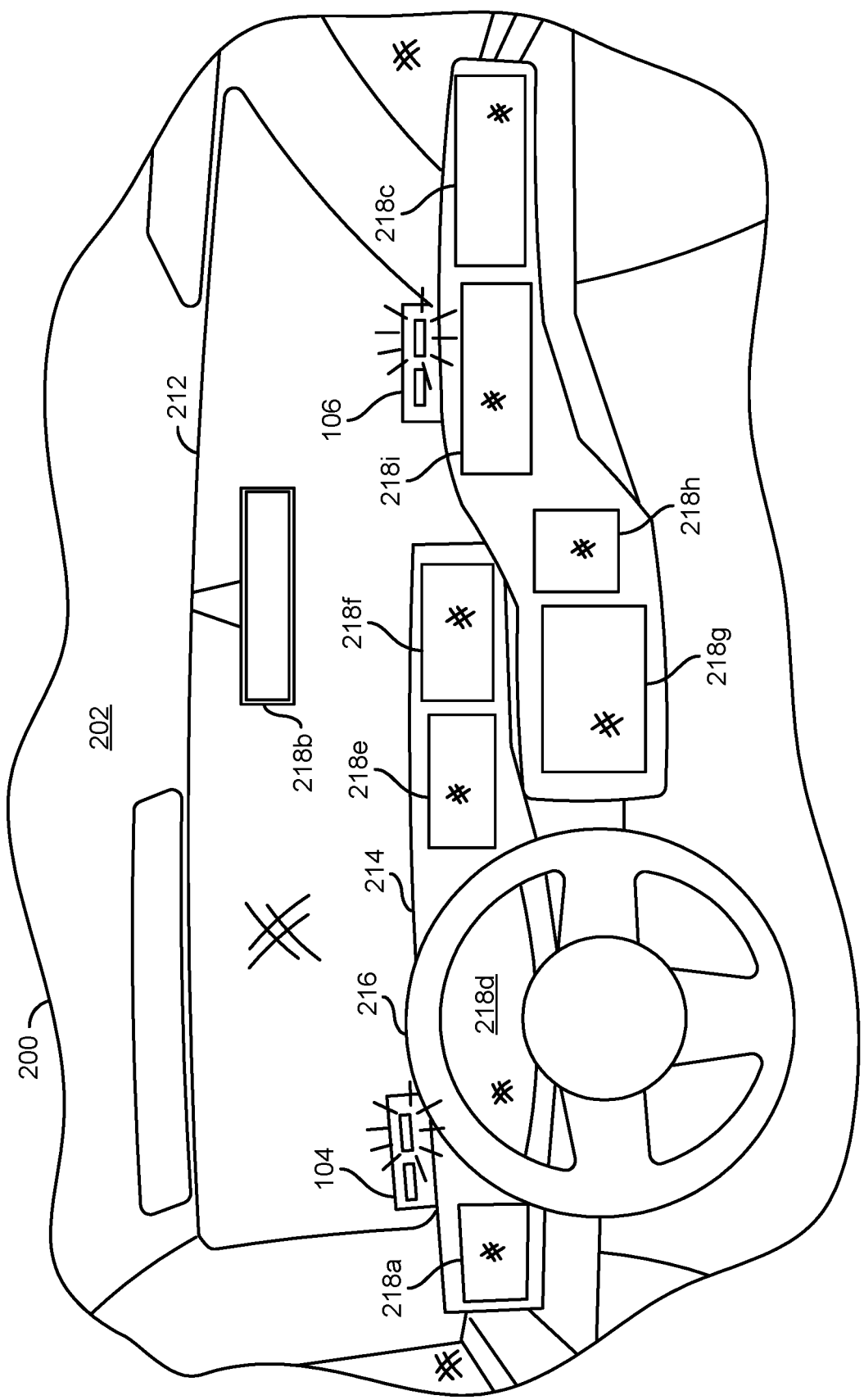
FIG. 3 is a diagram illustrating an example interior of a vehicle from the perspective of a driver.

Referring to FIG. 3, a diagram illustrating an example interior of a vehicle from the perspective of a driver is shown. A perspective 200 generally represents a view of an interior of a vehicle 202 from a location and a field of view of a driver of the vehicle 202. In an example, the interior of the vehicle 202 may comprise a windshield 212, a dashboard 214 and/or a steering wheel 216. A number of the displays 218a-218n may also be distributed around the interior of the vehicle 202. In the example shown, nine displays 218a-218i are shown. In general, the particular number of the displays 218a-218n available in the vehicle 202 may be varied according to the design criteria of a particular implementation. In an example, the DSM 104 may be located on the dashboard 214 to the left of the steering wheel 216 and the OMS 106 may be located on the dashboard on the right side of the vehicle 202. However, the locations of the DMS 104 and the OMS 106 may be varied according to the design criteria of a particular implementation. In general, the DMS 104 may be located to capture an unobstructed view of the driver of the vehicle 202. In an example, multiple instances of the OMS 106 may be installed in the passenger compartment of the vehicle 202. The number and/or locations of the instances of the OMS 106 may be varied according to the design criteria of a particular implementation.

In an example, one or more of the displays 218a-218i may be configured to display vehicle information (e.g., warning icons, speed, distance, temperature, odometer, etc.). In another example, one or more of the displays 218a-218i may be configured as an infotainment touchscreen display (e.g., providing a user interface for audio, navigation, hands-free phone communication, etc.).

In various embodiments, an in-cabin safety system generally utilizes the DMS 104 and the OMS 106. The DMS 104 generally includes a camera directed toward the face of the driver, in order to provide a real-time evaluation of the presence and the state of the driver. The instances of the OMS 106 generally includes one or more cameras directed toward passengers to provide understanding of passenger condition and even to provide a tailored environment specific to an identified occupant. The DMS 104 generally uses a monochrome global shutter sensor with a 940 nm light emitting diode (LED) flash. The LED flash is generally synchronized with a shutter time of the DMS camera to maintain low average power, which is beneficial for both human vision health and thermal considerations. In various embodiments, the OMS 106 uses a rolling shutter RGBIR sensor. A 940 nm near infrared (NIR) LED light source is generally utilized as well.

The 940 nm LED light sources of the DMS 104 and the instances of the OMS 106 are generally synchronized in accordance with example embodiments of the invention to prevent interference with each other, which can lead to vision algorithm failure. Because the LED light sources of the DMS 104 and the instances of the OMS 106 are generally synchronized, there is no need to arrange the DMS 104 and the OMS 106 instances in the cabin of the vehicle 202 to ensure the LED units point in different directions. Thus, the DMS 104 and the instances of the OMS 106 implemented in accordance with the present invention provide for improved convenience of installation over conventional units.

Figure 4:
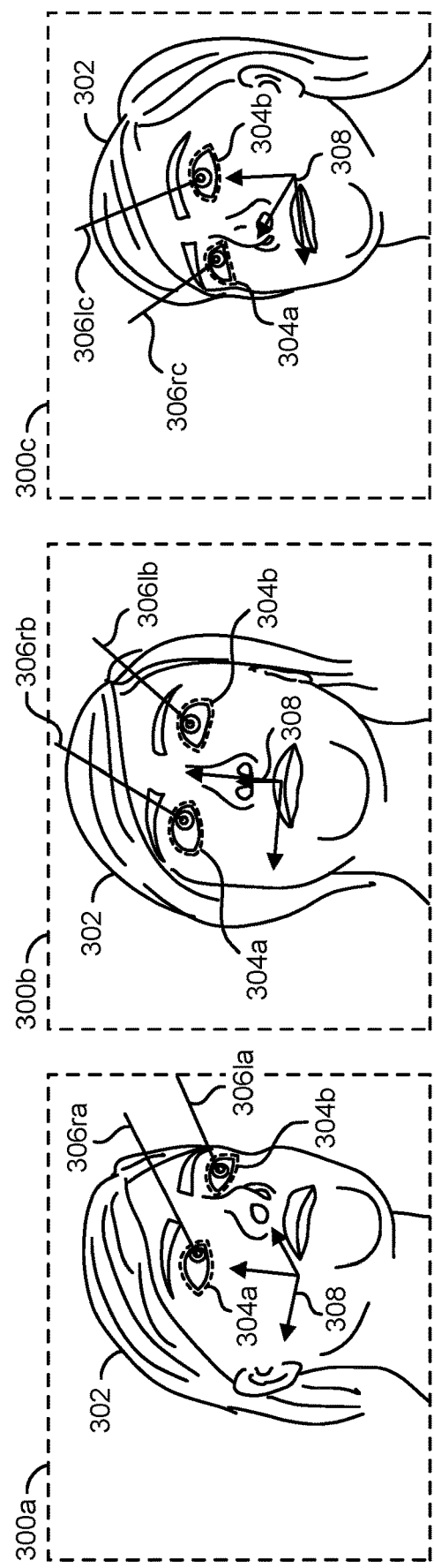
FIG. 4 is a diagram illustrating an example of using video frames for tracking a gaze of a driver.

Referring to FIG. 4, a diagram illustrating tracking a gaze of the driver of the vehicle 202 is shown. In an example, video frames 300a-300c may be used to represent video frames of a driver 302 captured by the DMS 104. In an example, monochrome global shutter CMOS sensor 120 of the DMS 104 may generate the video frames 300a-300c for analysis by a driver state monitoring system (DSMS) of the vehicle 202. In an example, the video frames 300a-300c may be a sequence of video frames (e.g., the video frame 300a may be captured first, then the video frame 300b, and then the video frame 300c). In another example, the video frames 300a-300c may be multiple video frames capturing the driver 302 simultaneously (e.g., the video frames 300a-300c may have the same time stamp). In the example, three capture devices may each capture a different angle of the driver 302 at the same time and the resulting video frames 300a-300c may be presented to the driver state monitoring system of the vehicle 202 for analysis.

In an example, a view of the head and face of the driver 302 is shown in each of the video frames 300a-300c. Dotted lines 304a-304b are shown around the eyes of the driver. The driver state monitoring system of the vehicle 202 may be configured to detect the location of the eyes of the driver 302. The dotted lines 304a-304b may represent the eyes of the driver 302 that have been detected by the driver state monitoring system of the vehicle 202.

Lines 306ra-306rc and lines 306la-306lc are shown. The lines 306ra-306rc are shown extending from the right eye 304a of the driver 302 in each of the video frames 300a-300c. The lines 306la-306lc are shown extending from the left eye 304b of the driver 302 in each of the video frames 300a-300c. The lines 306ra-306rc may represent the direction that the right eye 304a is pointed. The lines 306la-306lc may represent the direction that the left eye is pointed.

An axis 308 is shown in each of the video frames 300a-300c. The axis 308 may be a reference (e.g., not actually visible in the captured image). The axis 308 may be illustrated to indicate the direction that the driver 302 is facing. The axis 308 may be used by the driver state monitoring system of the vehicle 202 as a reference location for determining a location of the eyes 304a and 304b and/or the direction of the gaze in three dimensions.

Figure 5:
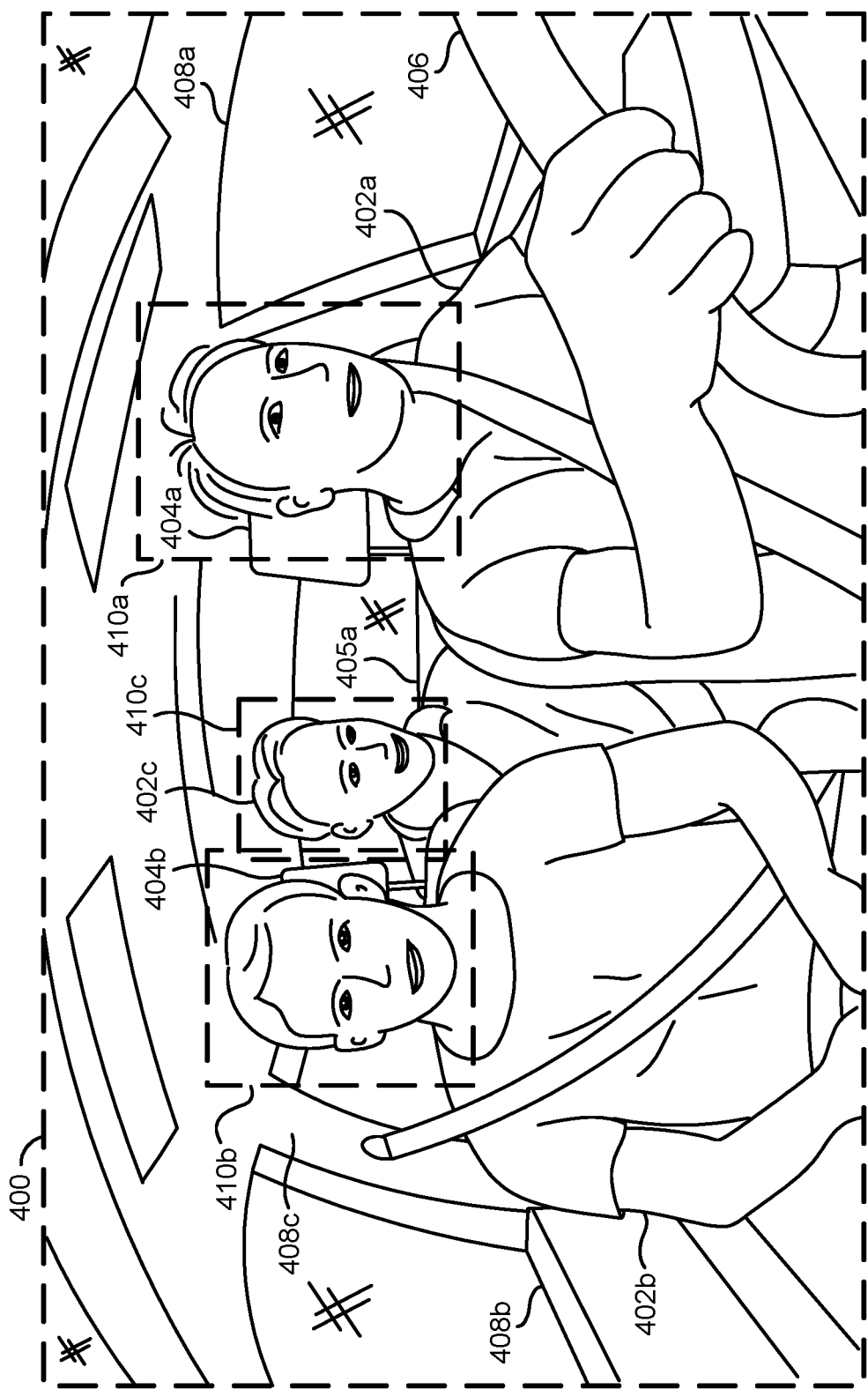
FIG. 5 is a diagram illustrating an example of using a processor to analyze a video frame for characteristics of passengers in a vehicle cabin.

Referring to FIG. 5, a diagram illustrating passengers in a video frame of a vehicle cabin is shown. In an example, a video frame 400 illustrates an example image captured by the OMS 106 of occupants 402a-402c within the cabin of the vehicle 202. In an example, the RGBIR rolling shutter CMOS sensor 130 of the OMS 106 may generate the video frame 400 for analysis by an occupant state monitoring system (OSMS) of the vehicle 202. In the example video frame 400, three occupants are shown. However, any number of occupants (e.g., 402a-402n, not shown), may be within the interior of the vehicle 202.

The video frame 400 may be a video frame captured by one or more of the instances of the OMS 106 in the interior of the vehicle 202. In one example, the sensor 130 may be implemented with a wide angle lens configured to capture a wide angle field of view of the interior of the vehicle 202. For example, the ISP 108 (or 108b) may be configured to perform video de-warping operations on potential distortions caused by the wide angle lens before performing the computer vision operations. In another example, the video frame 400 may be created by stitching together video frames captured at the same time by more than one instance of the OMS 106. Capturing a wide angle view and/or generating a stitched view of the interior of the vehicle 202 may enable the ISP 108 or 108a to analyze a view showing more than one of the occupants 402a-402n of the vehicle 202. The method of capturing the wide angle video frame 400 may be varied according to the design criteria of a particular implementation.

In the example video frame 400, a number of occupants 402a-402c, a number of seats 404a-404b, a bench seat 405a, and/or a steering wheel 406 are shown. For example, the driver 402a is shown in a driver seat 404a, the passenger 402b is shown in a passenger seat 404b, and the occupant 402c is shown in the bench seat 405a in the back row of the vehicle 202. In an example, a convolutional neural network (CNN) module may be configured to detect various objects in the video frame 400. In an example, computer vision operations may detect the steering wheel 406 (or other features of the interior of the vehicle 202). In another example, the computer vision operations may detect the driver seat 404a, the passenger seat 404b, and/or the back row bench seat 405a. In some embodiments, the ISP 108, 108b may determine whether the occupant 402a or 402b is the driver in response to the detected location of the steering wheel 406 (e.g., left side steering wheel or right side steering wheel).

Location references 408a-408n are shown in the interior of the vehicle 202. The location references 408a-408n may be objects detected by the CNN module that may be used as a reference point for determining a location within the vehicle 202. The location references 408a-408n may be generally static objects (e.g., objects that do not move, objects that only have a few positions, objects that move within a predefined range, etc.). The location reference 408a may be the driver side window (or door). The location reference 408b may be the passenger side door (or window). The location reference 408c may be a pillar of the vehicle 202 (e.g., a part of the vehicle frame). Other objects may be used as the location references 408a-408n. In an example, the steering wheel 406 may be one of the location references 408a-408n. In another example, one or more of the seats 404a-404n may be one of the location references 408a-408n. The types of objects that may be used as the location references 408a-408n may be varied according to the design criteria of a particular implementation.

Dotted boxes 410a-410c are shown. The dotted boxes 410a-410c may represent a detected object and/or group of objects (e.g., detected by the CNN module). The objects 410a-410c may be detected by the video operations performed by the ISP 108, 108b used to detect objects in the video frame 400. In an example, feature descriptors may be extracted from the video frame 400 and the CNN module used to compare the extracted features to known features (e.g., features extracted from a training data set).

The objects 410a-410c detected by the ISP 108, 108b may be objects comprising faces, body parts and/or heads of the occupants 402a-402c. In the example shown, the objects 410a-410c may be faces of the occupants 402a-402c. However, the computer vision operations performed by the ISP 108, 108b may analyze and/or characterize any combination of body parts of the occupants 402a-402c (e.g., shoulders, chest, legs, etc.). In an example, the ISP 108, 108b may be configured to limit a search region of the video frame 400 to detect an object that is a subset of another object. In one example, the ISP 108, 108b may be configured to detect the faces 410a-410c in the video frame 400 first and then search the region of the video frame 400 that corresponds to the faces 410a-410c in order to detect identifying features (e.g., eyes, mouths, noses, etc. that would not be located in a region of the video frame 400 that is not one of the faces 410a-410c. Limiting the search region for an object that is a subset of another object may reduce the amount of processing resources needed to detect a particular object.

The ISP 108, 108b may use the detected objects 410a-410c to locate the occupants 402a-402c within the vehicle 202. For example, the face 410a may correspond to the occupant 402a, the face 410b may correspond to the occupant 402b and the face 410c may correspond to the occupant 402c. Other body parts may be detected in order to locate the occupants 402a-402c (e.g., chest, torso, arms, etc.).

In some embodiments, the ISP 108, 108b may determine the location of the occupants 402a-402c within the cabin of the vehicle 202 by comparing the detected faces 410a-410c with the location references 408a-408n. For example, the ISP 108, 108b may be configured to store prior knowledge of the interior of the vehicle 202 in a database (e.g., location coordinates of the window 408a with respect to the capture device 130 that captured the video frame 400, location coordinates of the door 408b with respect to the capture device 130 that captured the video frame 400, etc.). Based on the location of the detected faces 410a-410c with respect to the previously known location of the location references 408a-408n, the ISP 108, 108b may determine the location of each of the occupants 402a-402n within the vehicle 202.

In an example, the ISP 108, 108b may be configured to detect the seats 404a-404b and/or the bench seat 405a and/or other objects of the interior of the vehicle 202. The ISP 108, 108b may be configured to associate a location of the occupants 402a-402c with the seats 404a-404b and/or the rear bench seat 405a. In an example, the ISP 108, 108b may detect the presence of the occupant 402b and that the location of the occupant 402b is in the front passenger seat 404b. In one example, the front passenger seat 404b may be one of the reference locations 408a-408n. In another example, the location of the passenger seat 404b may be associated with the reference location 408b (e.g., the passenger side door due to the proximity with the seat 404b).

In some embodiments, the ISP 108, 108b may be configured to determine a distance of the occupants 402a-402n by performing video-based measurements on the detected faces 410a-410n. In one example, 3D co-ordinates of the detected faces 410a-410c may be determined (e.g., by determining a horizontal co-ordinate, a vertical co-ordinate and/or a depth co-ordinate for each occupant 402a-402n with respect to the capture device 130). In another example, a sensor fusion module may be configured to analyze input from vehicle sensors to perform sensor fusion operations (e.g., cross-reference a location determined based on the computer vision operations with weight sensors located in the seats 404a-404b and/or the bench seat 405a, perform a comparison based on LIDAR, perform a comparison based on radar detection, etc.). In yet another example, the locations of various objects may be determined based on 3D positioning using a stereo pair of cameras (e.g., the video frame 400 may be one of a stereo pair of video frames captured by two instances of the capture devices 130 implemented as a stereo pair).

Locations may be further determined based on a monocular view (e.g., a monocular view may not provide an accurate result, but a high accuracy for location might not be necessary to tune the directional capabilities of the microphone, which may be relatively large areas of space). In some embodiments, the analysis performed by the ISP 108, 108b may be multi-functional. In the example shown, the ISP 108, 108b may detect the faces 410a-410c in order to determine a location of the occupants 402a-402n. In some embodiments, the ISP 108, 108b may further use the results of detecting the faces 410a-410n in order to detect facial features (e.g., perform facial recognition) and/or determine an age of the occupants 402a-402c). In some embodiments, the ISP 108, 108b may be configured to detect other characteristics of the detected faces 410a-410c and/or other body parts of the occupants 402a-402c (e.g., a body size, body proportions, a body orientation, etc.). For example, the location of the occupants 402a-402c may be used to strategically deploy air bags, provide notifications/warnings, adjust door locks, etc. The use of the results of the computer vision operations performed by the ISP 108, 108b may be varied according to the design criteria of a particular implementation.

Figure 6:
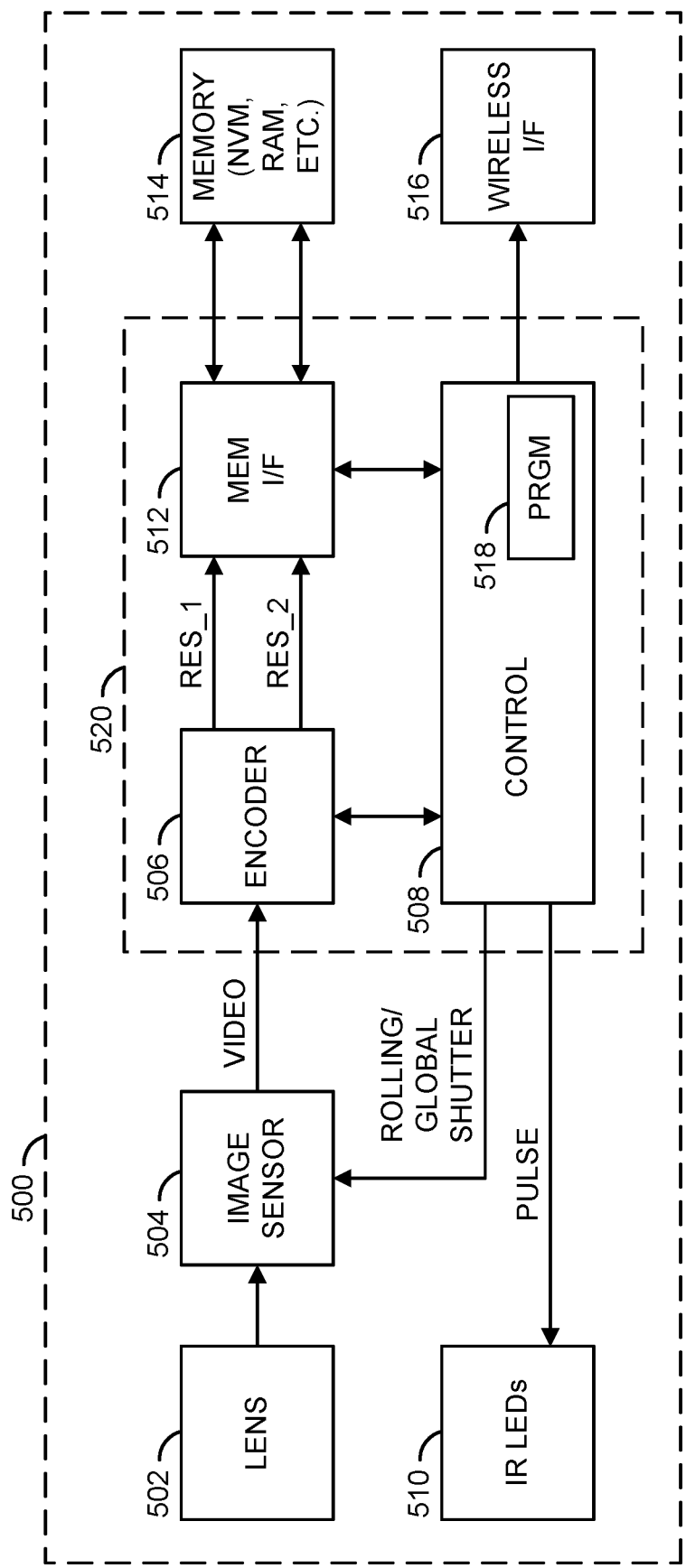
FIG. 6 is a diagram illustrating a camera circuit in accordance with an example embodiment of the invention.

Referring to FIG. 6, a block diagram of a device 500 is shown illustrating a video camera/recorder system in accordance with an example embodiment of the present invention. In an example, the device (or apparatus) 500 may be used to implement one or more of the DMS 104 and the OMS 106. In an example, the device 500 may comprise a block (or circuit) 502, a block (or circuit) 504, a block (or circuit) 506, a block (or circuit) 508, a block (or circuit) 510, a block (or circuit) 512, a block (or circuit) 514, and a block (or circuit) 516. The blocks 506, 508, 512, 514, and 516 may be implemented in hardware, software, firmware, or any combination thereof, and in one or multiple apparatuses (or devices).

In various embodiments, the device 500 may be implemented as a high-resolution (or high-definition) video camera/recorder. The device 500 may be operational to capture one or more video and/or audio streams (or clips) and collect various types of sensor information (data). In some embodiments, the device 500 may be operational to capture one or more high-bitrate (e.g., high resolution, etc.) video streams (or clips), corresponding lower bitrate (e.g., lower resolution, lower frame rate, higher predicted frames to reference frame ratio, altered quantization parameters, etc.) video streams (or clips), audio streams (or clips), and/or collect motion and position information. Low light/night vision video streams may be captured using the block 502 (e.g., a lens and associated actuator(s)), the block 504 (e.g., a rolling/global shutter complementary metal oxide semiconductor (CMOS) electro-optical sensor), and the block 510 (e.g., a 940 nm infrared light generating circuit). In various embodiments, the block 510 may be implemented using a number of 940 nm infrared (IR) light emitting diodes (LEDs). A high-bitrate video stream (e.g., RES_1) and/or one or more low bitrate video streams (e.g., RES_2) may be generated (e.g., processed, encoded, compressed, etc.) by the block 506 (e.g., an encoder). The block 506 may be operational to generate, process, and encode the video streams RES_1 and RES_2 using one or more proprietary and/or standard still and/or video codecs (e.g., JPEG, MJPEG, MPEG-2, MPEG-4, H.264, HEVC, etc.).

The low-bitrate video clips may contain the same content captured at the same time from the same point of view as the corresponding high-bitrate video clips. In some embodiments, the low-bitrate video clips may be a downscaled copy of the high-bitrate video clips. In other embodiments, the low-bitrate video clips and the high-bitrate video clips may be captured in parallel. For example, each frame captured by the block 506 may be processed as high-bitrate video and processed as downscaled low-bitrate video. In some embodiments, the low-bitrate video stream may be generated from the high-bitrate video stream through transcoding. In some embodiments, the higher bitrate stream may be decoded and then re-encoded into the lower bitrate stream.

The block 508 (e.g., a control circuit) may be configured to manage the block 504, the block 506, the block 510, and the block 512 (e.g., a memory interface) to store the video streams RES_1 and RES_2 in the block 514 (e.g., a memory). The block 514 may be implemented using various volatile (e.g., SRAM, DRAM, etc.) and/or non-volatile (e.g., flash, SD-card, xD-picture card, subscriber identity module (SIM) card, etc.) memory technologies. The block 508 may be further configured to communicate (e.g., transfer) at least a portion (e.g., a video stream, one or more short video clips, one or more still pictures, an audio stream, one or more audio clips, etc.) of high-res video data, low-bitrate video data, and/or audio data stored in the block 514 to an external device (e.g., a user device) via the block 516 (e.g., a wireless communication interface). For example, in various embodiments the block 516 may be configured to support one or more of, IEEE 802.11, IEEE 802.15, IEEE 802.15.1, IEEE 802.15.2, IEEE 802.15.3, IEEE 802.15.4, IEEE 802.15.5, IEEE 802.20, Bluetooth®, and/or ZigBee®. In some embodiments, the block 516 may also implement one or more protocols (e.g., GSM, CDMA, GPRS, UMTS, CDMA2000, 3GPP LTE, 4G/HSPA/WiMAX, SMS, etc.) associated with cellular communication networks.

In various embodiments, the block 508 may include programming code 518 (e.g., microcode, firmware, software, etc.) for controlling/directing operation of the block 508 and/or sub-circuits of the block 508. The programming code 518 may configure the block 508 to implement a method in accordance with an embodiment of the invention. For example, the programming code 518 may direct the block 508 in capturing and processing a video data signal (e.g., VIDEO) from the block 504, generating a signal (e.g., ROLLING/GLOBAL SHUTTER) and a signal (e.g., PULSE), and interacting with the blocks 512, 514, and 516. The signal ROLLING/GLOBAL SHUTTER may implement one or more control signals for controlling the image sensor 504. In various embodiments, the signal ROLLING/GLOBAL SHUTTER may comprise a global shutter control signal or signals for controlling an exposure window of the block 504. The signal ROLLING/GLOBAL SHUTTER may also comprise various signals (e.g., vertical sync, horizontal sync, etc.) for controlling video-related operations of the image sensor 504. The signal PULSE may implement a control signal for controlling an infrared light pulse within an infrared light emitting window. In various embodiments, the signal PULSE may control a width of the infrared emitting window and/or an amplitude of the infrared illumination (e.g., varying a number of infrared (IR) light emitting diodes (LEDs) used to generate the infrared illumination). In some embodiments, the blocks 506, 508, and 512 may be implemented together as a single integrated circuit 520 (e.g., a processor/camera chip or System on Chip (SoC)).

In some embodiments, the device 500 is implemented as a low light/night vision camera including wireless (e.g., WiFi, Bluetooth®, ZigBee®, etc.) connectivity. The addition of WiFi, ZigBee®, Bluetooth® and/or cellular wireless connectivity into the device 500 allows the device 500 to send video images, still images, audio clips, and/or other collected data wirelessly to a remote location (e.g., a user device, the Internet, a secure server, a cloud computer, a security service, a police department, an emergency responder, and/or other predetermined recipient). In one example, bandwidth may be reduced by uploading post-processed data instead of entire video sequences (or clips). In one example, the device 500 may implement one or more protocols (e.g., GSM, CDMA, GPRS, UMTS, CDMA2000, 3GPP LTE, 4G/HSPA/WiMAX, SMS, etc.) associated with cellular telephone networks. By uploading the video clips, still images, audio clips, and/or collected (or post-processed) data to the Internet/Cloud, the data may be preserved.

Figure 7:
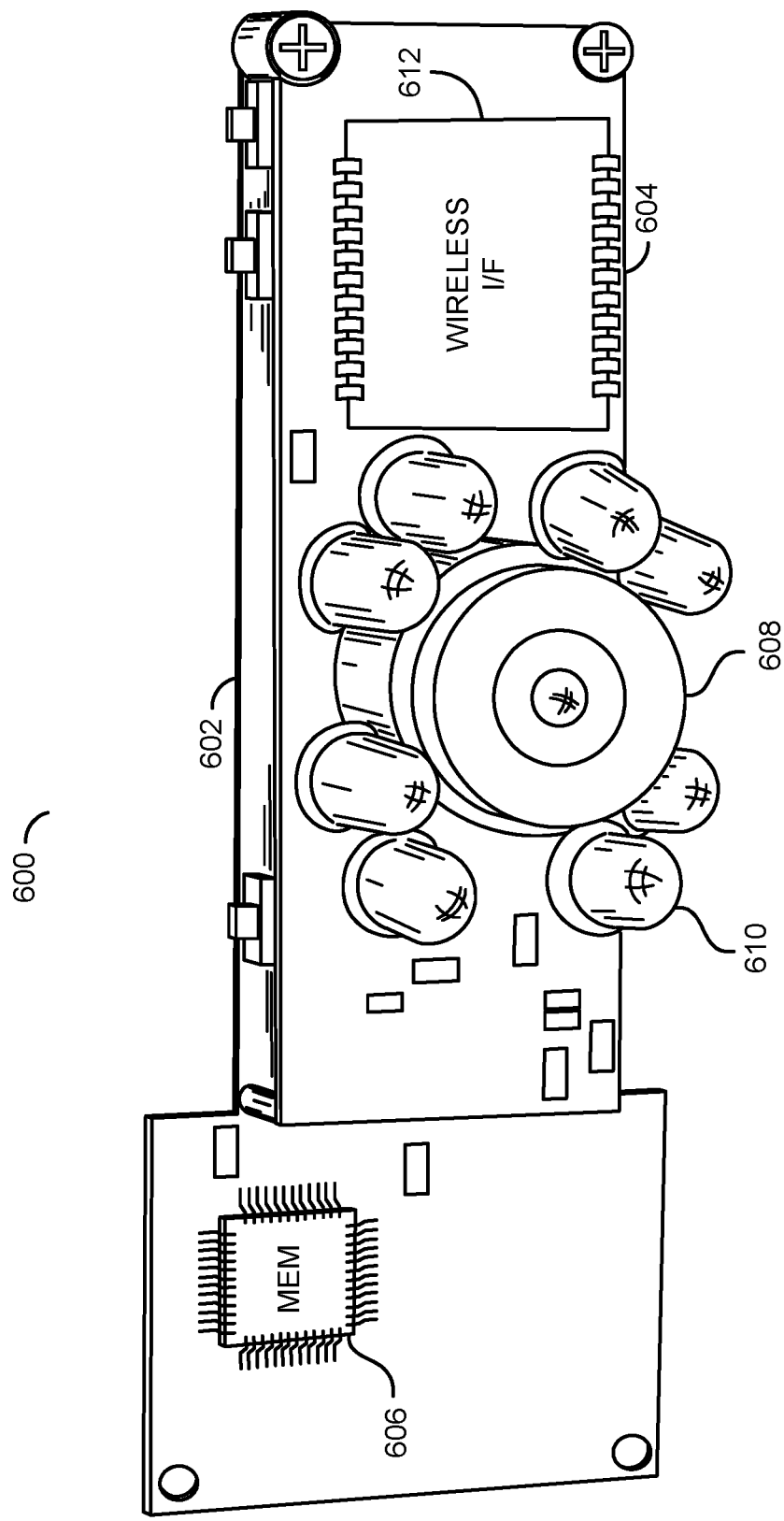
FIG. 7 is a diagram illustrating an example implementation of the camera of FIG. 6.

Referring to FIG. 7, a diagram is shown illustrating an example implementation of a night vision camera 600 in accordance with an embodiment of the invention. In various embodiments, the camera 600 may comprise a first printed circuit board 602 and a second printed circuit board 604. The printed circuit boards 602 and 604 may be mounted together. The printed circuit board 602 may include a memory circuit (or chip) 606, a processor circuit and either a monochrome global shutter CMOS sensor or an RGBIR rolling shutter CMOS sensor (obscured by printed circuit board 604). The printed circuit board 604 may include a lens 608, a number of 950 nm LEDs 610, and a wireless interface circuit (or module) 612. In one example, the wireless interface 612 may comprise a pre-certified wireless/cellular protocol module.

Figure 8:
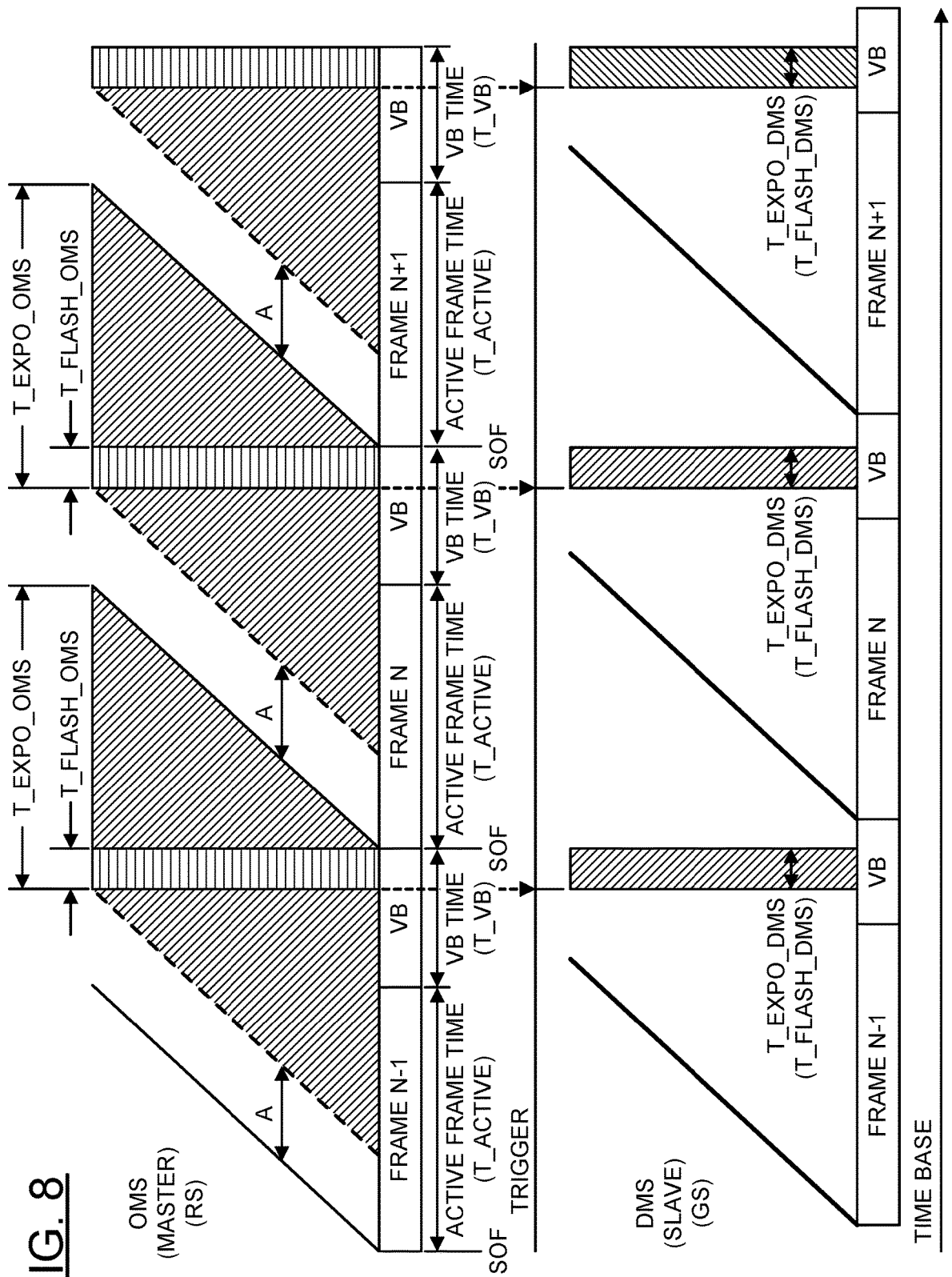
FIG. 8 is a diagram illustrating a first example mode of operation of DMS and OMS cameras in accordance with an example embodiment of the invention.

Referring to FIG. 8, a diagram illustrating an example mode of operation of DMS and OMS cameras in accordance with an example embodiment of the invention is shown. In a first mode, the flash circuit 132 of the OMS camera 106 operates as a master flash circuit and the flash circuit 122 of the DMS camera 104 operates as a slave flash unit. In the first mode, the LED flash 132 has a short ON time (e.g., less than a time of a vertical blanking (VB) period) and the RGBIR rolling shutter CMOS sensor 130 has a long exposure time (e.g., greater than an active frame time (T_ACTIVE)). The short ON time of the LED light source generally results in a low average power consumption for the LED flash 132.

In an example, the block (or circuit) 110 may be configured based upon parameters and/or characteristics of the sensors used to implement the circuits 120 and 130. In an example, the parameters of the sensor 130 may include, but are not limited to, a start of frame (SOF), a frame time (T_frame), an active frame time (T_active), a vertical blanking period duration (T_vb), an exposure time of the OMS 106 (T_expo_oms), a flash period of the LED flash 132 (T_flash_oms), and reset/readout period (a). In an example, the block (or circuit) 110 may be configured to control the signals OMS_TRIG and DMS_TRIG according to the following equations.

$$T\_frame = T\_active + T\_vb \quad \text{EQ. 1}$$

$$a = T\_frame - T\_expo\_oms \quad \text{EQ. 2}$$

$$T\_flash\_oms = T\_frame - T\_active - a = T\_vb - a = T\_expo\_oms - T\_active. \quad \text{EQ. 3}$$

If (a=0), $$T\_flash\_oms(max) = T\_frame - T\_expo\_oms = T\_vb \quad \text{EQ. 4}$$

$$T\_expo\_oms(max) = T\_vb + T\_active = T\_frame \quad \text{EQ. 5}$$

$$T\_expo\_dms = T\_flash\_dms = T\_flash\_oms \quad \text{EQ. 6}$$

where
 0<T_flash_oms<T_vb;
 T_active<T_expo_oms<T_frame; and
 0<(T_expo_dms=T_flash_dms)<T_vb.

In an example, the trigger timing may be calculated using the following expression: (SOF+a+T_active) OR (SOF+T_frame−T_expo_oms+T_active).

In an example, the signals DMS_TRIG and OMS_TRIG may be generated so that the flash period T_flash_oms and the flash period T_flash_dms are synchronized and fall within the respective vertical blanking periods of the sensors 120 and 130. The flash period T_flash_oms generally overlaps a portion of the exposure (integration) time T_expo_oms when all rows of the sensor 130 are integrating. The flash period T_flash_dms generally overlaps (or is coextensive with) the exposure time (T_expo_dms) of the sensor 120.

Figure 9:
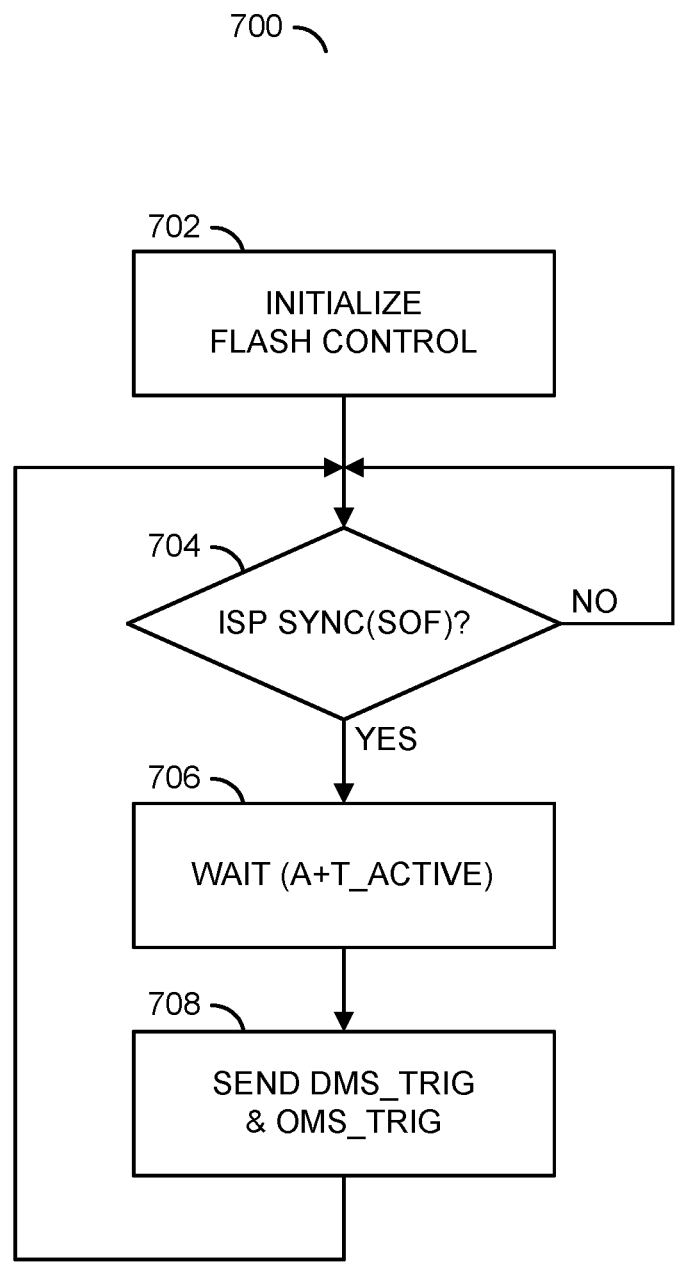
FIG. 9 is a flow diagram illustrating an example process performed using the apparatuses of FIGS. 1 and 2 during the mode of operation of FIG. 8.

Referring to FIG. 9, a flow diagram is shown illustrating an example process performed using the apparatuses of FIGS. 1 and 2 during the first mode of operation illustrated in FIG. 8. In the first mode, a process (or method) 700 may be implemented to generate the signals DMS_TRIG and OMS_TRIG. In an example, the process 700 may comprise a step (or state) 702, a decision step (or state) 704, a step (or state) 706, and a step (or state) 708. In the step 702, the process 700 may initialize the flash control circuit 110 with parameters (e.g., A, T_ACTIVE, T_FRAME, T_EXPO_DMS, T_EXPO_OMS, T_VB, etc.) of the sensors 120 and 130. In the decision step 704, the process 700 may check whether the ISP channels of the ISP 108 (or ISPs 108a-108n) have communicated (e.g., via the signal ISP_SYNC) a start of frame (SOF) for the sensor 130. If a SOF has not been received, the process 700 loops in the step 704. If a SOF has been received, the process 700 may move to the step 706 where the process 700 causes the circuit 110 wait for a delay period determined based on the parameters A and T_ACTIVE. In an example, the delay may be set as a sum of the parameters A and T_ACTIVE. When the delay period expires, the process 700 may move to the step 708 where the signals DMS_TRIG and OMS_TRIG are asserted by the circuit 110 for a predetermined amount of time (e.g., T_FLASH_DMS and T_FLASH_OMS, respectively. The process 700 may then return to the decision step 704.

Figure 10:
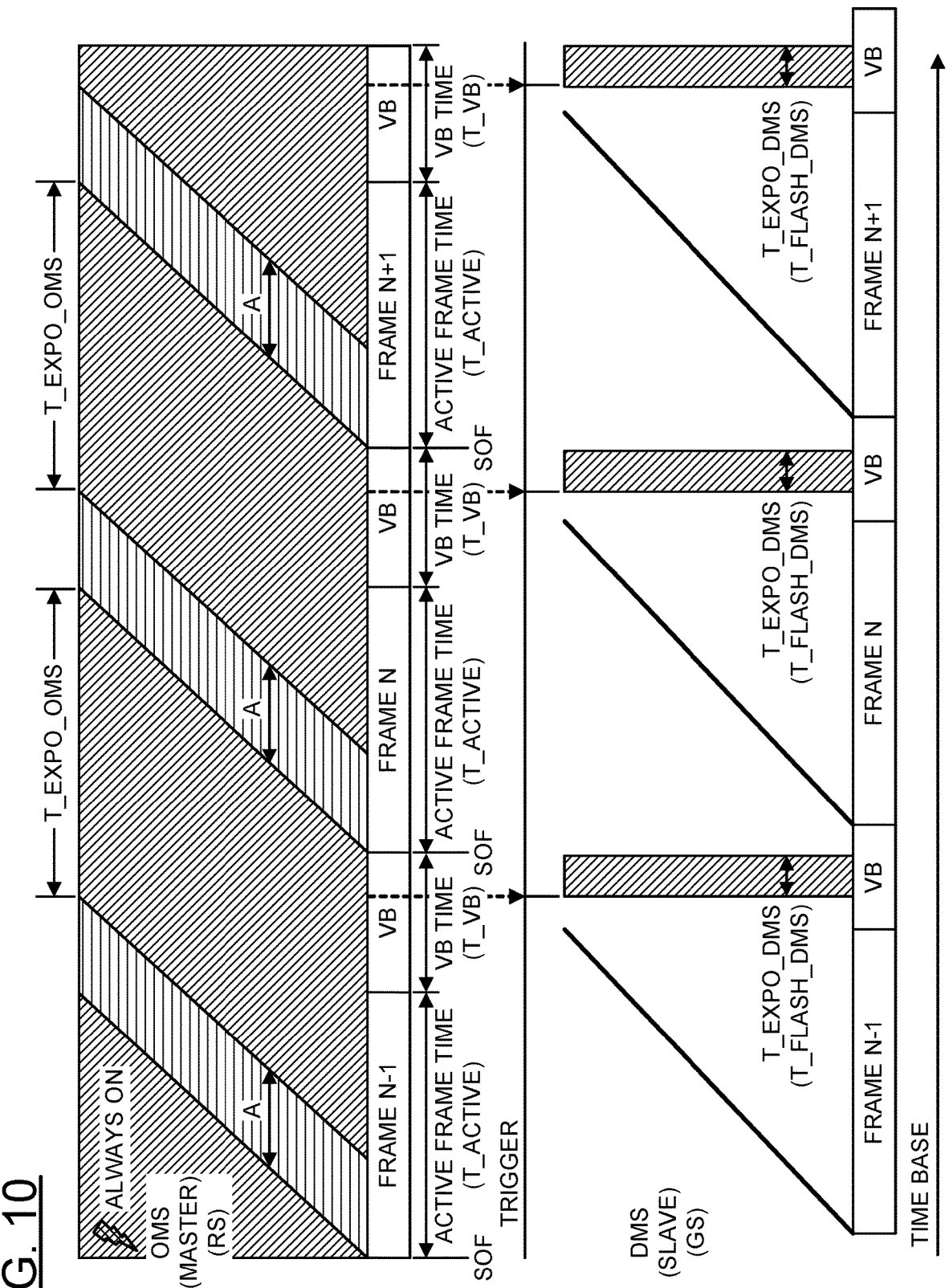
FIG. 10 is a diagram illustrating a second example mode of operation of DMS and OMS cameras in accordance with an example embodiment of the invention.

Referring to FIG. 10, a diagram illustrating an example mode of operation of DMS and OMS cameras in accordance with an example embodiment of the invention is shown. In a second mode, the flash circuit 132 of the OMS camera 106 operates as the master flash circuit and the flash circuit 122 of the DMS camera 104 operates as the slave flash unit. In the second mode, the LED flash 132 is ON continuously and, therefore covers the entire exposure time T_expo_oms of the RGBIR rolling shutter CMOS sensor 130. Because the LED light source of the OMS 106 is continuously ON, the timing is simplified (e.g., no need to control the LED flash 132). The block (or circuit) 110 may be configured to control the signals OMS_TRIG and DMS_TRIG according to the following equations.

$$T\_frame = T\_active + T\_vb \quad \text{EQ. 1}$$

$$a = T\_frame - T\_expo\_oms \quad \text{EQ. 2}$$

$$T\_expo\_dms + T\_active \leq T\_expo\_oms \qquad \text{EQ. 7}$$

where

T_active<T_expo_oms<T_frame; and
0<(T_expo_dms=T_flash_dms)<T_vb.

In an example, the signal DMS_TRIG may be generated so that the flash period T_flash_dms falls within the respective vertical blanking periods of the sensors 120 and 130 and overlaps a portion of the exposure (or integration) time T_expo_oms when all the rows of the sensor 130 are integrating. The flash period T_flash_dms generally overlaps (or is coextensive with) the exposure time (T_expo_dms) of the sensor 120.

Figure 11:
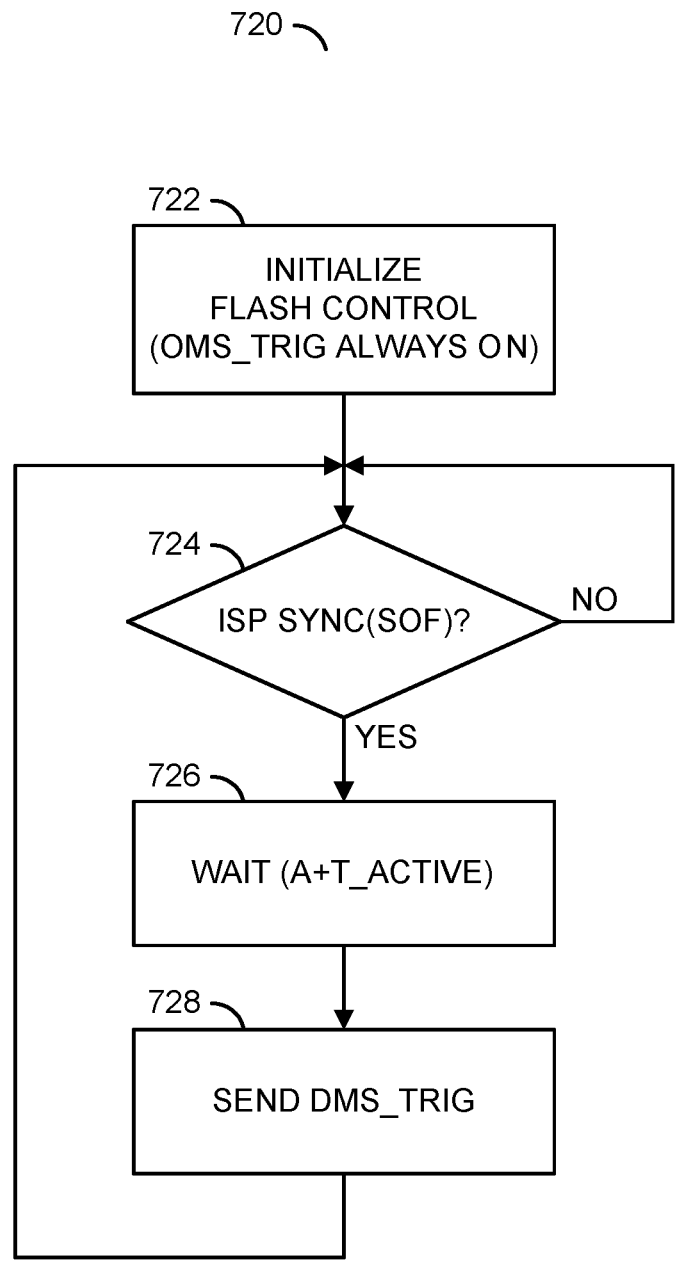
FIG. 11 is a flow diagram illustrating an example process performed using the apparatuses of FIGS. 1 and 2 during the mode of operation of FIG. 10.

Referring to FIG. 11, a flow diagram is shown illustrating an example process performed by the apparatuses of FIGS. 1 and 2 during the mode of operation of FIG. 10. In the second mode, a process (or method) 720 may be implemented to generate the signals DMS_TRIG and OMS_TRIG. In an example, the process 720 may comprise a step (or state) 722, a decision step (or state) 724, a step (or state) 726, and a step (or state) 728. In the step 722, the process 700 may initialize the flash control circuit 110 with the parameters (e.g., A, T_ACTIVE, T_FRAME, T_EXPO_DMS, T_EXPO_OMS, T_VB, etc.) of the sensors 120 and 130 and assert the signal OMS_TRIG to turn on the LED light source 132 continuously. In the decision step 724, the process 720 may check whether the ISP channels of the ISP 108 (or ISPs 108a-108n) have communicated (e.g., via the signal ISP_SYNC) a start of frame (SOF) for the sensor 130. If a SOF has not been received, the process 720 loops in the step 724. If a SOF has been received, the process 720 may move to the step 726 where the process 720 may cause the circuit 110 to wait for a delay period determined by the parameters A and T_ACTIVE. In an example, the delay may be set as a sum of the parameters A and T_ACTIVE. When the delay period expires, the process 720 may move to the step 728 where the signal DMS_TRIG is asserted by the circuit 110 for a predetermined amount of time (e.g., T_flash_dms). The process 720 may then return to the decision step 724.

Figure 12:
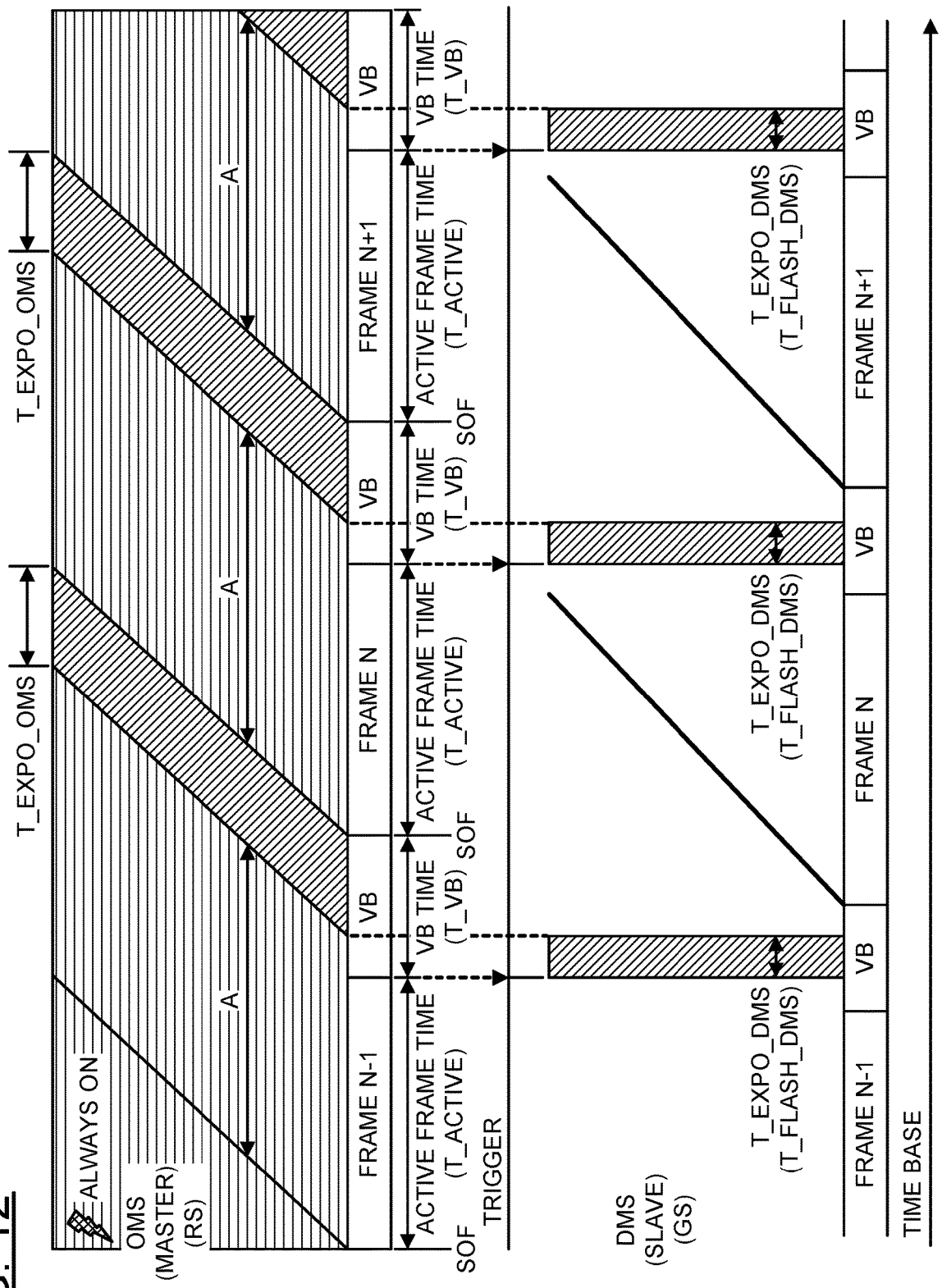
FIG. 12 is a diagram illustrating a third example mode of operation of DMS and OMS cameras in accordance with an example embodiment of the invention.

Referring to FIG. 12, a diagram illustrating an example mode of operation of DMS and OMS cameras in accordance with an example embodiment of the invention is shown. In a third mode, the flash circuit 132 of the OMS camera 106 operates as the master flash circuit and the flash circuit 122 of the DMS camera 104 operates as the slave flash unit. In the third mode, the exposure time T_expo_oms of the RGBIR rolling shutter CMOS sensor 130 is short than the vertical blanking period and significantly shorter than the reset/readout time (a). In the third mode, the LED flash 132 is ON continuously and, therefore covers the entire exposure time T_expo_oms of the RGBIR rolling shutter CMOS sensor 130. Because the LED light source of the OMS 106 is continuously ON, the timing is simplified (e.g., no need to control the LED flash 132). The block (or circuit) 110 may be configured to control the LED flash 122 and the monochrome global shutter CMOS sensor 120 such that the flash period T_flash_dms and the exposure time T_expo_dms occur during the period (a) and the vertical blanking period of the RGBIR rolling shutter CMOS sensor 130. Because the LED flash 122 is asserted outside the exposure (or integration) period of the RGBIR rolling shutter CMOS sensor 130, the LED flash 122 does not cause interference with the exposure time T_expo_oms of the RGBIR rolling shutter CMOS sensor 130. In the third mode, the block (or circuit) 110 may be configured to control the signals OMS_TRIG and DMS_TRIG according to the following equations.

$$T\_frame = T\_active + T\_vb \qquad \text{EQ. 1}$$

$$a = T\_frame - T\_expo\_oms \qquad \text{EQ. 2}$$

$$T\_expo\_dms = a - T\_active = T\_frame - T\_expo\_oms - T\_active = T\_vb - T\_expo\_oms \qquad \text{EQ. 8}$$

where

0<T_expo_oms<T_vb; and
0<(T_expo_dms=T_flash_dms)<T_vb−T_expo_oms.

Figure 13:
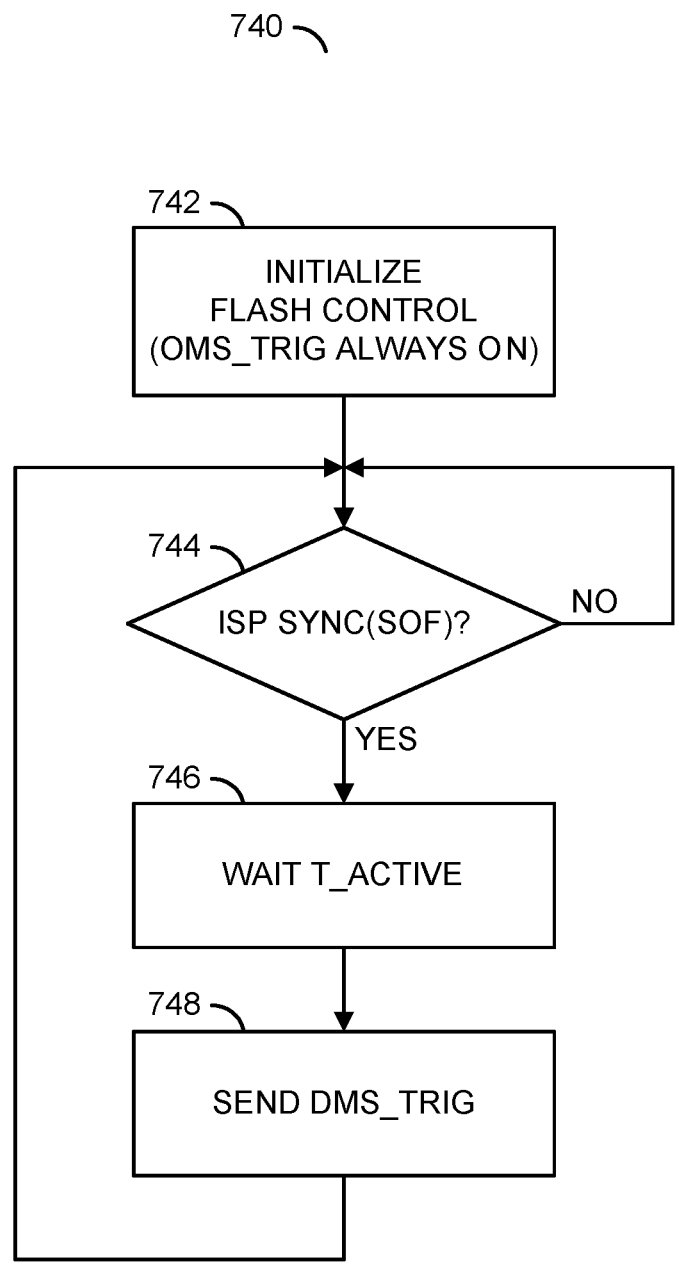
FIG. 13 is a flow diagram illustrating an example process performed using the apparatuses of FIGS. 1 and 2 during the mode of operation of FIG. 12.

Referring to FIG. 13, a flow diagram is shown illustrating an example process performed by the apparatuses of FIGS. 1 and 2 during the mode of operation of FIG. 12. In the third mode, a process (or method) 740 may be implemented to generate the signals DMS_TRIG and OMS_TRIG. In an example, the process 740 may comprise a step (or state) 742, a decision step (or state) 744, a step (or state) 746, and a step (or state) 748. In the step 742, the process 700 may initialize the flash control circuit 110 with parameters (e.g., A, T_ACTIVE, T_FRAME, T_EXPO_DMS, T_EXPO_OMS, T_VB, etc.) of the sensors 120 and 130 and assert the signal OMS_TRIG to turn on the LED light source 132 continuously. In the decision step 744, the process 740 may check whether the ISP channels of the ISP 108 (or ISPs 108a-108n) have communicated (e.g., via the signal ISP_SYNC) a start of frame (SOF) for the sensor 130. If a SOF has not been received, the process 740 loops in the step 744. If a SOF has been received, the process 740 may move to the step 746 where the process 700 causes the circuit 100 to wait for a delay period determined by the parameter T_ACTIVE. When the delay period expires, the process 740 may move to the step 748 where the signal DMS_TRIG is asserted by the circuit 110 for a predetermined amount of time. The process 740 may then return to the decision step 744.

Figure 14:
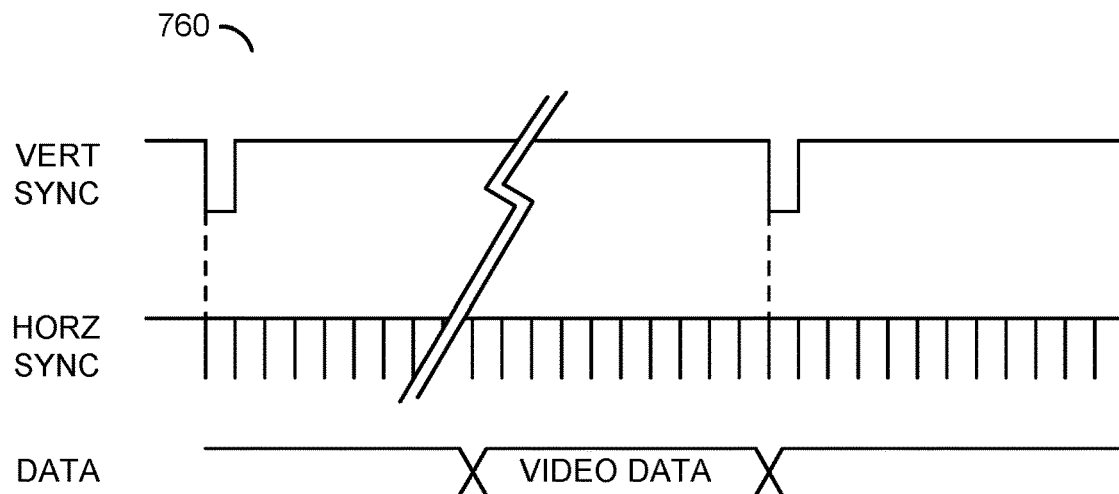
FIG. 14 is a diagram illustrating example implementations of an image sensor interface.
Figure 14:
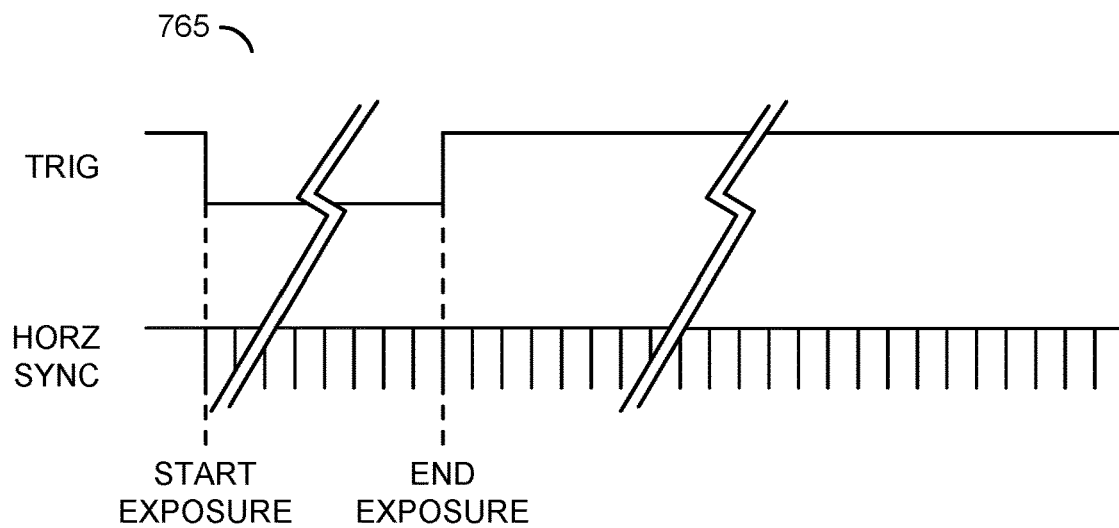
Figure 14:
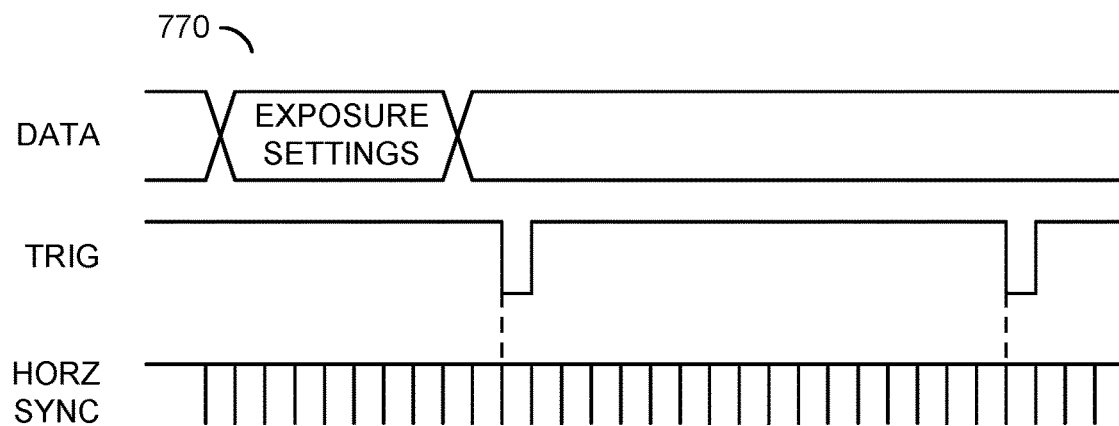

Referring to FIG. 14, a diagram is shown illustrating example implementations of a variety of image sensor interfaces. The example interfaces in FIG. 14 are illustrative and are not to be construed as intended to limit the manner in which the processor and image sensor may be coupled or communicate. In some embodiments, an interface 760 may be implemented between a processor and a CMOS image sensor. The interface 760 may comprise a vertical synchronization signal (e.g., VERT SYNC), a horizontal synchronization signal (e.g., HORZ SYNC), and a video data path. The signal VERT SYNC may be used to trigger a transfer of the image data from the pixel elements to the associated memory elements of the image sensor. The signal HORZ SYNC may be used to clock out the image data as a signal VIDEO DATA. A delay between assertion of the signal VERT SYNC and the beginning of the signal VIDEO DATA is generally determined by a design of the sensor. In embodiments implementing the interface 760, the exposure start is determined by the video modes, blanking periods, and related delays. The timing of the exposure window may be calculated from a timing diagram of the particular sensor and the IR illumination timed to occur after the exposure start time and within the exposure window.

In some embodiments, an interface 765 may be implemented between the processor and the CMOS image sensor. The interface 765 may comprise an exposure trigger signal (e.g., TRIG), a horizontal synchronization signal (e.g., HORZ SYNC), and a video data path (not shown). The signal TRIG may be used to control the length of the exposure window of the CMOS sensor and trigger a transfer of the image data from the pixel elements to the associated memory elements of the image sensor. When the signal TRIG is asserted (e.g., switched to a LOW state), the exposure window starts and the CMOS image sensor begins integration of the incident light. When the signal TRIG is de-asserted (e.g., switched to a HIGH state), the exposure window ends and the CMOS image sensor transfers the image data from the pixel elements to the storage elements. Similar to the interface 760, the signal HORZ SYNC may be used to clock out the image data as the signal VIDEO DATA. A delay between the signal TRIG being de-asserted and the beginning of the signal VIDEO DATA is generally determined by a design of the sensor. In embodiments implementing the interface 765, the exposure start and exposure window are determined by the signal TRIG. In some embodiments, the exposure window and IR illumination window may be set by configuration values stored in registers and/or configuration bits. The processor can implement control logic (e.g., software, firmware, circuitry) to calculate the timing of the IR pulse to be synchronized with the signal TRIG. For example, the processor may use a first GPIO to control the integration on/off and a second GPIO to control the IR illumination on/off. In embodiments implementing the interface 765, the processor may implement real-time control for each frame.

In some embodiments, an interface 770 may be implemented between the processor and the CMOS image sensor. The interface 770 may comprise an exposure setting data path, an exposure trigger signal (e.g., TRIG), a horizontal synchronization signal (e.g., HORZ SYNC), and a video data path (not shown). The exposure window duration may be programmed by data (e.g., EXPOSURE SETTINGS) communicated to the image sensor via the exposure setting data path. The signal TRIG may be used to control the start of the exposure window of the CMOS sensor. Transfer of the image data from the pixel elements to the associated memory elements of the image sensor is controlled by the image sensor based upon the EXPOSURE SETTINGS data. When the signal TRIG is asserted (e.g., switched to a LOW state), the exposure window starts and the CMOS image sensor begins integration of the incident light. When the predetermined exposure/integration time ends, the CMOS image sensor transfers the image data from the pixel elements to the storage elements. Similar to the interface 760, the signal HORZ SYNC may be used to clock out the image data from the storage elements as the signal VIDEO DATA. A delay between the signal TRIG being asserted and the beginning of the signal VIDEO DATA may be calculated based on the EXPOSURE SETTINGS data and a timing diagram of the sensor. In embodiments implementing the interface 770, the exposure start and exposure window are determined by the signals TRIG and EXPOSURE SETTINGS. The processor generally includes control logic (e.g., software, firmware, circuitry) to calculate the timing of the IR pulse to be synchronized with the signal TRIG. For example, the processor may use a first GPIO or SIO to program the integration duration, a second GPIO to control assertion of the signal TRIG, the and a third GPIO to control the IR illumination on/off.

Figure 15:
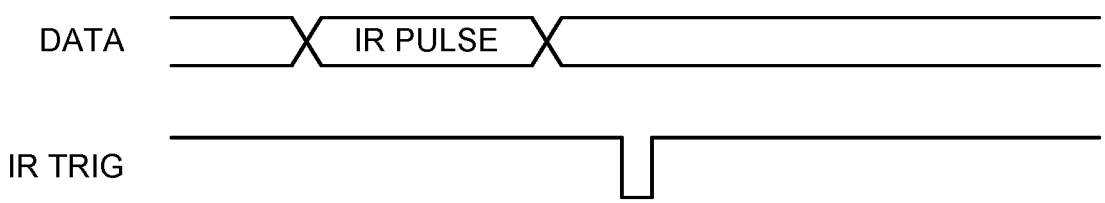
FIG. 15 is a diagram illustrating example implementations of an infrared (IR) LED interface.
Figure 15:
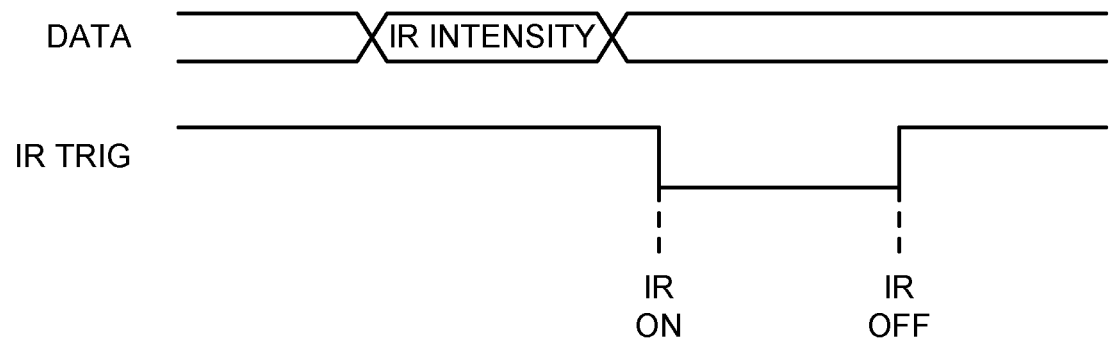

Referring to FIG. 15, a diagram is shown illustrating example implementations of a variety of IR LED interfaces. The example interfaces in FIG. 15 are illustrative and are not to be construed as intended to limit the manner in which the processor and IR LED module may be coupled or communicate.

In some embodiments, an interface 780 may be implemented between the processor and the IR LED module. The interface 780 may comprise an IR flash setting data path and an IR flash trigger signal (e.g., IR TRIG). The duration of infrared illumination window (e.g., IR ON to IR OFF), corresponding to one or both of the times T_flash_dms and T_flash_oms, and the flash intensity may be programmed by data (e.g., IR PULSE) communicated to the IR LED module via the IR flash setting data path. The signal IR TRIG may be used to control the start of the IR light flash. When the signal IR TRIG is asserted (e.g., switched to a LOW state), the IR illumination starts and the predetermined number of IR LEDs may be switched on to emit infrared light. When the predetermined IR flash time ends, the predetermined number of IR LEDs may be switched off. The processor 102 generally includes control logic (e.g., software, firmware, circuitry) to calculate the timing of the IR flash to be synchronized with the exposure window of the CMOS image sensor. For example, the processor 102 may use a first GPIO (general purpose input/output) or SIO (serial input/output) to program the IR flash duration and intensity, and a second GPIO to control assertion of the signal IR TRIG.

In some embodiments, an interface 785 may be implemented between the processor and the IR LED module. The interface 785 may comprise an IR pulse setting data path and an IR flash trigger signal (e.g., IR TRIG). The intensity (e.g., number of IR LEDs turned on) of the IR light pulse may be programmed by data (e.g., IR INTENSITY) communicated to the IR LED module via the IR flash setting data path. The signal IR TRIG may be used to control the start and duration of the IR light flash. When the signal IR TRIG is asserted (e.g., switched to a LOW state), the IR flash window starts and the predetermined number of IR LEDs are switched on to emit infrared light. When the signal IR TRIG is de-asserted (e.g., switched to a HIGH state), the IR flash window ends and the predetermined number of IR LEDs are switched off. The processor generally includes control logic (e.g., software, firmware, circuitry) to calculate the timing of the IR flash to be synchronized with the exposure window (e.g., T_expo_oms or T_expo_dms) of the CMOS image sensor. For example, the processor may use a first GPIO or SIO to program the IR flash intensity, and a second GPIO to control assertion of the signal IR TRIG to control the IR illumination on/off.

Figure 16:
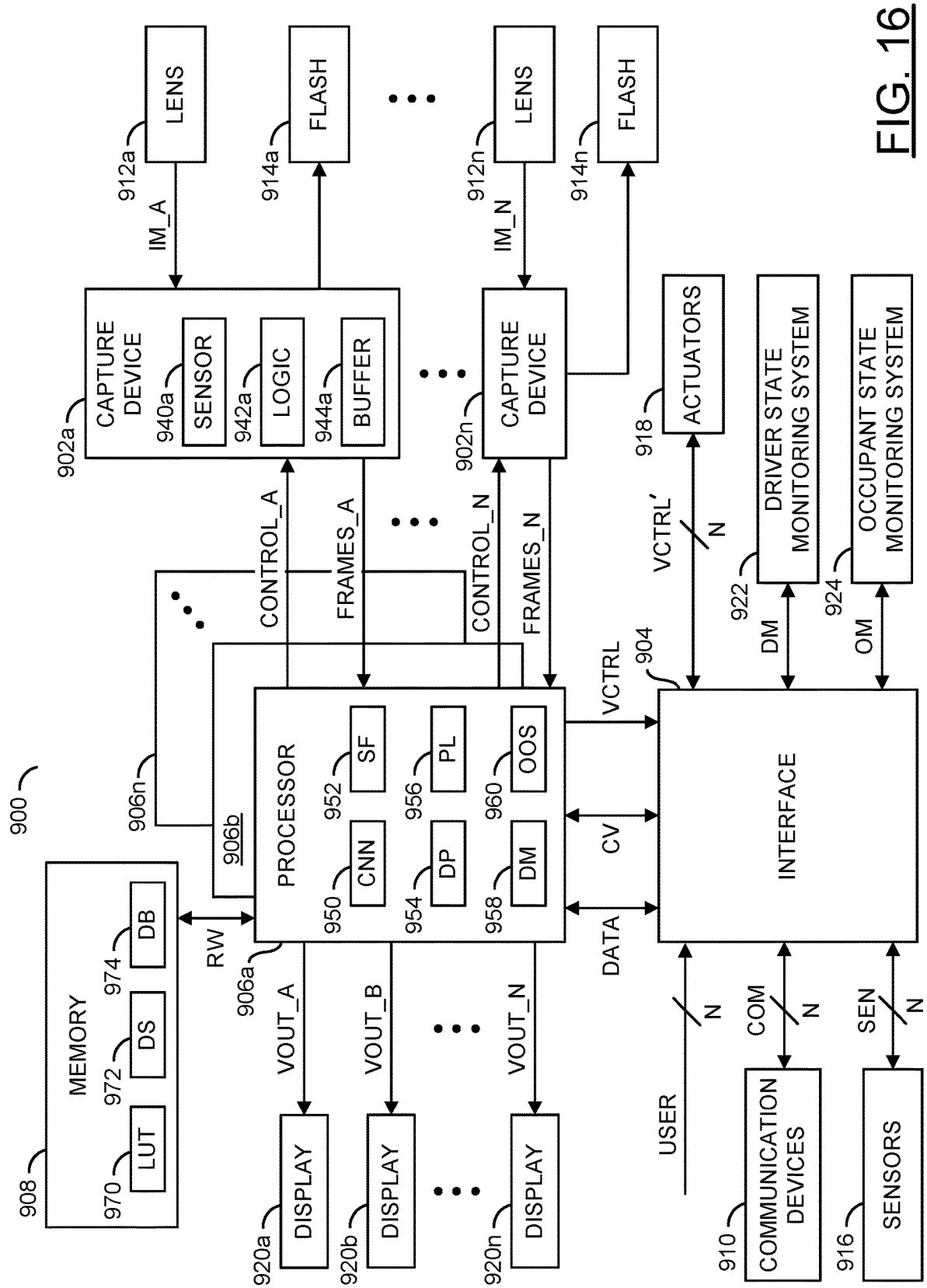
FIG. 16 is a diagram illustrating an apparatus in accordance with another example embodiment of the invention.

Referring to FIG. 16, a diagram of an apparatus 900 is shown illustrating a driver and occupant monitoring system in accordance with another example embodiment of the present invention. The apparatus 900 generally comprises and/or communicates with blocks (or circuits) 902a-902n, a block (or circuit) 904, blocks (or circuits) 906a-906n, a block (or circuit) 908, a block (or circuit) 910, blocks (or circuits) 912a-912n, blocks (or circuits) 914a-914n, a block (or circuit) 916, a block (or circuit) 918, blocks (or circuit) 920a-920n, a block (or circuit) 922, and/or a block (or circuit) 924. The circuits 902a-902n may each implement a capture device. The circuits 904 may implement an interface circuit. The circuits 906a-906n may each implement a processor (or co-processors). In an example implementation, the circuits 906a-906n may each be implemented as a video processor and/or a computer vision processor. The circuit 908 may implement a memory. The circuit 910 may implement one or more communication devices. The blocks 912a-912n may implement lenses. The blocks 914a-914n may implement LED Flash units. The circuit 916 may implement one or more vehicle sensors. The circuit 918 may implement one or more vehicle actuators. The circuits 920a-920n may each implement a display. The circuit 922 may implement a driver state monitoring system (DSMS). The circuit 924 may implement an occupant state monitoring system (OSMS). The apparatus 900 may comprise other components (not shown). The number, type and/or arrangement of the components of the apparatus 900 may be varied according to the design criteria of a particular implementation.

In various embodiments of the apparatus 900, the components 902a-922 may be implemented as a distributed camera system. In the distributed camera system embodiment of the apparatus 900, each component may be implemented separately throughout an installation location (e.g., such as a vehicle). In some embodiments, some of the components 902a-924 may be implemented on a single module and some of the components 902a-924 may be distributed throughout the installation location. For example, the apparatus 900 may be implemented as a drop-in solution (e.g., installed as one component). In some embodiments, the apparatus 900 may be a device that may be installed as an after-market product for a vehicle (e.g., a retro-fit for a vehicle).

In some embodiments, the apparatus 900 may implement one of the processors 906a-906n. In some embodiments, the apparatus 900 may implement multiple processors 906a-906n. For example, the processors 906a may have multiple co-processors 906b-906n. Similarly, the interface 904 may be implemented as multiple interfaces each supporting different communication protocols. In another example, the communication devices 910 may be implemented as many modules, each implementing a different communications standard (e.g., Bluetooth, Wi-Fi, LTE, etc.). In some embodiments, one or more of the components 902a-924 may be one or more other of the components 902a-922. For example, the memory 908 may be implemented as a component of the processors 906a-906n. In another example, the lenses 912a-912n, the flash units 914a-914n, and the capture devices 902a-902n may each be implemented as a respective single assembly. Generally, a portion of the apparatus 900 may be implemented as a system-on-chip (SoC).

The lenses 912a-912n (e.g., an optical lens) may be configured to capture a targeted view. Some of the lenses 912a-912n may be implemented to provide a targeted view of an area exterior to an object (e.g., the outside of a car). Some of the lenses 912a-912n may be implemented to provide a targeted view of an interior of an object (e.g., the cabin of a vehicle). The lenses 912a-912n may each capture and/or focus light as input data (e.g., IM_A-IM_N) and present the respective light input data IM_A-IM_N to a respective one of the capture devices 902a-902n.

In embodiments implementing many of the lenses 912a-912n, each of the lenses 912a-912n may point in a different direction. By having each of the lenses 912a-912n capture a different direction, the apparatus 900 may capture a panoramic view of the environment and/or the interior of a vehicle. The lenses 912a-912n may be arranged to capture fields of view above and/or below a level of the vehicle. In some embodiments, lenses 912a-912n may be implemented having a wide angle (or fisheye) lens. The panoramic video may comprise a large field of view generated by one or more lenses/camera sensors. One example of a panoramic video may be a 360 equirectangular video. Equirectangular video may also be called spherical panoramas. Panoramic video may be a video that provides a field of view that is larger than the field of view that may be displayed on a device used to playback the video (e.g., one of the displays 920a-920n).

Each of the capture devices 902a-902n may comprise one of blocks (or circuits) 940a-940n, one of blocks (or circuits) 942a-942n and/or one of blocks (or circuits) 944a-944n. The blocks 940a-940n may implement an image sensor (e.g., a camera sensor). The blocks 942a-942n may implement logic. The blocks 944a-944n may implement a buffer. For clarity, in the example shown, only the image sensor 940a, the logic 942a and the buffer 944a of the capture device 902a are shown. The capture devices 902a-902n may each be configured to receive a respective one of the signals IM_A-IM_N, a respective signal (e.g., CONTROL_A-CONTROL_N) and/or present a respective signal (e.g., FRAMES_A-FRAMES_N).

The capture devices 902a-902n may each be configured to generate images and/or video frames in response to the signals IM_A-IM_N (e.g., perform an analog to digital conversion). The capture devices 902a-902n may capture data received through the lenses 912a-912n to generate video image data (e.g., generate video frames). The flash units 914a-914n may provide flashes of infrared light to illuminate the environment from which images are captured. The signals FRAMES_A-FRAMES_N may comprise video frames and/or images generated by the capture devices 902a-902n (e.g., video data). In some embodiments, the capture devices 902a-902n may be configured to perform depth sensing (e.g., the signals FRAMES_A-FRAMES_N may comprise depth information and/or vector light data in addition to the video frames). In one example, the capture devices 902a-902n may perform depth sensing using stereo cameras (e.g., cameras configured as a stereo pair to capture a depth map). In another example, the capture devices 902a-902n may perform depth sensing using time-of-flight. In yet another example, the capture devices 902a-902n may perform depth sensing using structured light. The video frames FRAMES_A-FRAMES_N may be presented to one or more of the processors 906a-906n. The signals CONTROL_A-CONTROL_N may comprise instruction signals for the capture devices 902a-902n and/or the lenses 912a-912n (e.g., to zoom, pan, focus, adjust settings, etc.). The signals CONTROL_A-CONTROL_N may be generated by the processors 906a-906n.

The interface circuit 904 may be configured to transmit and/or receive a number of signals. The interface circuit 904 may be configured to communicate information and/or convert information to/from various protocols. In some embodiments, the interface 904 may be implemented as one of the components of the processors 906a-906n. In some embodiments, the interface 904 may be implemented as a vehicle bus (e.g., a CAN bus). For example, for low speed communication, the vehicle CAN bus may be implemented. In some embodiments, the interface 904 may implement a high speed data transmission protocol (e.g., for video transmission). For example, the interface 904 may implement one or more of Ethernet, PCI-e, MIPI, etc. In some embodiments, the interface 904 may comprise many different components, each configured to communicate using a particular protocol. The implementation of the interface 904 may be varied according to the design criteria of a particular implementation.

In the example shown, the interface 904 may send and/or receive a signal (e.g., DATA), a signal (e.g., CV), a signal (e.g., VCTRL), a signal (e.g., COM), a signal (e.g., SEN), a signal (e.g., VCTRL'), a signal (e.g., USER), a signal (e.g., OM), and/or a signal (e.g., DM). The signal USER may represent user inputs (e.g., turn signals, pressing the accelerator, pressing the brakes, interactions with an infotainment system, etc.). The signal SEN may represent information related to the vehicle sensors 916 such as calibration data from the processors 906a-906n and/or status information of the vehicle based on sensor readings (e.g., speed, acceleration, temperature, location, gyro orientation, etc.). The signal COM may represent information communicated to/from the communication devices 910. The signal VCTRL and VCTRL' may represent control instructions generated by the processors 906a-906n for the various vehicle actuators 918. The signal CV may represent computer vision data. The signal DATA may represent other data. The signal DM may represent data corresponding to a driver state (e.g., a direction of a gaze of a driver, the sight line of the driver, the direction the driver is looking, etc.). The signal OM may represent data corresponding to an occupant state (e.g., number of occupants, position of occupants, size of occupants, age of occupants, etc.). The number of signals communicated and/or the types of data communicated using the interface 904 may be varied according to the design criteria of a particular implementation.

The processors 906a-906n may each comprise a block (or circuit) 950, a block (or circuit) 952, a block (or circuit) 954, a block (or circuit) 956, a block (or circuit) 958 and/or a block (or circuit) 960. The block 950 may implement a convolutional neural network (CNN) module. The block 952 may implement a sensor fusion module. The block 954 may implement a driving policy module. The block 956 may implement a video processing pipeline module. The block 958 may implement a decision making module. The block 960 may implement an open operand stack module. The processors 906a-906n may comprise other components (not shown). In some embodiments, one or more of the processors 906a-906n may not comprise each of the blocks 950-960. The number, type and/or arrangement of the components of the processors 906a-906n may be varied according to the design criteria of a particular implementation.

The processors 906a-906n may be configured to execute computer readable code and/or process information. The processors 906a-906n may each be configured to receive the signals FRAMES_A-FRAMES_N, transmit the signal VCTRL, signals (e.g., VOUT_A-VOUT_N) and/or send/receive the signal DATA, the signal CV and/or a signal (e.g., RW). The signals VOUT_A-VOUT_N may each provide a video data output to a corresponding one of the displays 920a-920n. For example, the processors 906a-906n may be configured to generate the video data (e.g., VOUT_A-VOUT_N) for the displays 920a-920n in response to the video frames (e.g., FRAMES_A-FRAMES_N). The signal RW may communicate data to/from the memory 908. The signals VOUT_A-VOUT_N, the signals CONTROL_A-CONTROL_N, the signal DATA, the signal CV, the signal RW and/or the signal VCTRL may be generated based on one or more decisions made by the processors 906a-906n. The decisions made by the processors 906a-906n may be determined based on data received by the processors 906a-906n and/or based on an analysis of the signals FRAMES_A-FRAMES_N. The processors 906a-906n may implement other signals (not shown). The number and/or type of signals communicated by the processor 906a-906n may be varied according to the design criteria of a particular implementation.

The memory 908 may comprise a block (or circuit) 970, a block (or circuit) 972, and/or a block (or circuit) 974. The block 970 may implement a look up table. The block 972 may implement data storage. The block 974 may implement database. The memory 908 may be configured to store computer readable/executable instructions (or firmware or code). The instructions, when executed by the processors 906a-906n, may perform a number of steps. In some embodiments, the processors 906a-906n may be implemented as a system-on-chip (SoC) and the memory 908 may be a component of the processors 906a-906n. The arrangement and/or type of data stored and/or the memory technology implemented (e.g., NAND, RAM, memristor, etc.) by the memory 908 may be varied according to the design criteria of a particular implementation.

The communication devices 910 may send and/or receive data to/from the apparatus 900. In some embodiments, the communication devices 910 may be implemented as a wireless communications module. In some embodiments, the communication devices 910 may be implemented as a satellite connection to a proprietary system (e.g., to provide advanced driver-assistance systems (ADAS) data and/or telemetry data). In some embodiments, the communication devices 910 may implement GPS and/or GNSS functionality. In one example, the communication device 910 may be a hard-wired data port (e.g., a USB port, a mini-USB port, a USB-C connector, HDMI port, an Ethernet port, a DisplayPort interface, a Lightning port, a Thunderbolt port, a PCI-e interface, a MIPI interface, etc.). In another example, the communication device 910 may be a wireless data interface (e.g., Wi-Fi, Bluetooth, ZigBee, cellular (3G/4G/5G/LTE), etc.). In another example, the communication devices 910 may implement a radio-frequency (RF) transmitter.

The communication devices 910 may include support for wireless communication by one or more wireless and/or cellular protocols such as Bluetooth®, ZigBee®, IEEE 802.11, IEEE 802.15, IEEE 802.15.1, IEEE 802.15.2, IEEE 802.15.3, IEEE 802.15.4, IEEE 802.15.5, IEEE 802.20, GSM, CDMA, GPRS, UMTS, CDMA2000, 3GPP LTE, 4G/HSPA/WiMAX, SMS, etc. The communication devices 910 may also include support for communication using one or more of the universal serial bus protocols (e.g., USB 9.0, 2.0, 3.0, etc.).

The sensors 916 may be used to determine the status information of the host object (e.g., the vehicle). The sensors 916 may implement a sensor array. The sensor array 916 may be used to determine the position of objects in a proximity range with respect to the apparatus 900. For example, the sensors 916 may implement a radar device, an array of radars, a sonar device, an array of sonars, a LIDAR device, an array of LIDAR devices, an ultra-sound device, an array of ultra-sound devices, etc. The sensors 916 may provide the sensor readings using the signal SEN. In some embodiments, the sensors 916 may be calibrated using the signal SEN. The types of the vehicle sensors 916 used to detect a proximity to other objects may be varied according to the design criteria of a particular implementation.

The actuators 918 may be used to cause an action. The actuators 918 may be implemented as an array of components. The actuators 918 may be configured to convert an electrical signal comprising information and/or instructions (e.g., the signal VCTRL') into a physical action. In an example, the actuators 918 may be configured to turn wheels, increase an acceleration, decrease an acceleration, activate and/or adjust headlights, activate a turn signal, activate air bags, etc. The actuators 918 may control various components of the host vehicle. In an example, the actuators 918 may include actuators in driver-related systems and actuators in occupant-related systems. The actuators 918 may allow control signals generated by the DSMS 922 and/or the OSMS 924 to control the driver-related systems and the occupant-related systems. The number, type and/or functionality of the actuators 918 may be varied according to the design criteria of a particular implementation.

The displays 920a-920n may be each implement a screen and/or an output device. In one example, one or more of the displays 920a-920n may implement an electronic mirror (e.g., an e-mirror). In another example, one or more of the displays 920a-920n may implement a touchscreen for an infotainment system. In yet another example, one or more of the displays 920a-920n may implement a back-up camera and/or bird's eye view camera. The displays 920a-920n may display a version of video frames captured by one or more of the lenses 912a-912n and/or the capture devices 902a-902n. The video frames captured by the capture device 902a-902n may be cropped, adjusted and/or encoded by the processors 906a-906n to fit the display 920a-920n. For example, the processor 906a-906n may provide real-time video streaming to the displays 920a-920n via the signals VOUT_A-VOUT_N.

The sensor 940a (e.g., a camera imaging sensor such as a CMOS sensor) of the capture device 902a may receive light from the lens 912a (e.g., the signal IM_A). The camera sensor 940a may perform a photoelectric conversion of the light from the lens 912a. The logic 942a may transform the bitstream into a human-legible content (e.g., video data and/or video frames). For example, the logic 942a may receive pure (e.g., raw) data from the camera sensor 940a and generate video data based on the raw data (e.g., the bitstream). The logic 942a may further control the lens 912a in response to the signal CONTROL_A. The memory buffer 944a may store the raw data and/or the processed bitstream. For example, the frame memory and/or buffer 944a may store (e.g., provide temporary storage and/or cache) one or more of the video frames (e.g., the video signal). In some embodiments, each of the capture devices 902a-902n may comprise other components (e.g., a battery, a motor, a microphone, etc.).

The CNN module 950 may be configured to implement convolutional neural network capabilities. The CNN module 950 may be configured to implement computer vision using deep learning techniques. The CNN module 950 may be configured to implement pattern and/or image recognition using a training process through multiple layers of feature-detection.

The sensor fusion module 952 may be configured to analyze information from multiple sensors 914, capture devices 902a-902n, the driver state monitoring system 922, and/or the occupant state monitoring system 924 for redundancy. By analyzing various data from disparate sources, the sensor fusion module 952 may be capable of making inferences about the data that may not be possible from one of the data sources alone. For example, the sensor fusion module 952 may analyze video data as well as radar, LIDAR, inertial, motion, V2X, location data (e.g., GPS, GNSS, ADAS, etc.), gaze direction, driver state and/or other sources to develop a model of a scenario to support decision making. The sensor fusion module 952 may also provide time correlation, spatial correlation and/or reliability among the data being received from the different sensors 916.

In an example, the sensor fusion module 952 may spatially overlay an object captured by a camera with the same object captured by LIDAR for better identification and/or ranging (distance and relative velocity) to that object. In a time correlation example, an object may be seen by two sensors at slightly different times (e.g., side-facing sensors near the front bumper and the rear bumper). The sensor fusion module 952 may time shift the data from a leading sensor to align with the data from the trailing sensor. Information from motion sensors may be integrated into the time correlation to determine which sensor is leading, which sensor is trailing and/or how fast the detected object is moving.

In a reliability example, the sensor fusion module 952 may determine the reliability of objects detected by each sensor. The sensor fusion module 952 may adjust the weighting used to overlay the data to give more weight to reliable data and/or less weight to unreliable data (e.g., one of the capture devices 902a-902n may have low reliability in foggy conditions, but radar may have good reliability in foggy conditions). A confidence that the object is really there and is correctly identified may also be calculated in the sensor fusion module 952. The confidence data may be presented to the driving policy block 954 via an on-chip bus, rather than relying on an inter-chip bus.

The driving policy module 954 may be configured to enable human-like intuition. The driving policy module 954 may allow the vehicle to share the road with human drivers. For example, sensing, mapping, and powerful computer vision may provide a model of the environment and/or reaction time of a vehicle to be better than that of a human driver. Applying machine learning to develop and evolve a driving policy may be utilized to provide a human-like intuition and/or behavior needed to analyze multi-variable situations and/or negotiate with human drivers. In an example, the driving policy module 954 may provide a rule set for ethics when making decisions.

The video pipeline 956 may be configured to encode video frames captured by each of the capture devices 902a-902n. In some embodiments, the video pipeline 956 may be configured to perform video stitching operations to stitch video frames captured by each of the lenses 912a-912n to generate the panoramic field of view (e.g., the panoramic video frames). The video pipeline 956 may be configured to perform de-warping, cropping, enhancements, rolling shutter corrections, stabilizing, downscaling, packetizing, compression, conversion, blending, synchronizing and/or other video operations. The architecture of the video pipeline 956 may enable the video operations to be performed on high resolution video and/or high bitrate video data in real-time and/or near real-time. The video pipeline module 956 may enable computer vision processing on 4K resolution video data, stereo vision processing, object detection and/or high dynamic range processing. The type of video operations and/or the type of video data operated on by the video pipeline 956 may be varied according to the design criteria of a particular implementation.

The video pipeline module 956 may implement a digital signal processing (DSP) module configured to receive information (e.g., pixel data values captured by the sensors 940a-940n) from the input signals FRAMES_A-FRAMES_N. The video pipeline module 956 may be configured to determine the pixel values (e.g., RGB, YUV, luminance, chrominance, etc.). The video pipeline module 956 may be further configured to support or provide a sensor RGB to YUV raw image pipeline to improve image quality, perform bad pixel detection and correction, demosaicing, white balance, color and tone correction, gamma correction, adjustment of hue, saturation, brightness and contrast adjustment, chrominance and luminance noise filtering.

The video pipeline module 956 may encode the raw image data into a plurality of encoded video streams simultaneously (in parallel). The plurality of video streams may have a variety of resolutions (e.g., VGA, WVGA, QVGA, SD, HD, Ultra HD, 4K, 8K, etc.). The video pipeline module 956 may receive encoded and/or unencoded (e.g., raw) audio data from an audio interface. The video pipeline module 956 may also receive encoded audio data from a communication interface (e.g., USB and/or SDIO). The video pipeline module 956 may provide encoded video data to the communication devices 910 (e.g., using a USB host interface) and/or the displays 920a-920n (e.g., the signal VOUT_A-VOUT_N).

The decision making module 958 may be configured to generate the signal VCTRL. The decision making module 958 may be configured to use the information from the computer vision operations and/or the sensor fusion module 952 to determine which actions may be taken. For example, in an autonomous vehicle implementation, the decision making module 958 may determine which direction to turn. The decision making module 958 may utilize data from the CNN module 950 and/or computer vision data using a histogram oriented gradient (HOG). The sources of data for making decisions used by the decision making module 958 may be varied according to the design criteria of a particular implementation.

The decision making module 958 may be further configured to determine the video data to communicate to the displays 920*a*-920*n*. The signals VOUT_A-VOUT_N may be cropped and/or adjusted in response to decisions by the decision making module 958. For example, the decision module 958 may select one field of view (e.g., a wide angle field of view) instead of another field of view (e.g., a narrow angle field of view) to send to the display 920*a* as the signal VOUT_A. In another example, the decision making module 958 may determine which of the displays 920*a*-920*n* to use to display a notification. In yet another example, the decision making module 958 may adjust output characteristics of the displays 920*a*-920*n* (e.g., brightness).

The operand stack module 960 generally contains basic tasks used in all autonomous vehicles (e.g., object detection, correlation, reliability, etc.). The openness of the operand stack module 960 may enable car manufacturers to add new and/or proprietary features that could distinguish particular vehicles in the marketplace. The open operand stack module 960 may enable programmability.

The look up table 970 may comprise reference information. In one example, the look up table 970 may allow the captured video data to be compared to and/or cross-referenced with some known set of data. In another example, the look up table 970 may allow the sensor fusion module 952 to compare and/or cross-reference data from the sensors 914 with some known sensor values (e.g., temperature, humidity, etc.). Generally, the look up table 970 may be implemented to index pre-calculated values to save computation time.

The data storage 972 may comprise various data types stored by the memory 908. In an example, the data storage 972 may correspond to detected objects, reference objects, a video file, status information (e.g., readings from the sensors 914) and/or metadata information. The types of data and/or the arrangement of data stored in the memory 908 may be varied according to the design criteria of a particular implementation.

In some embodiments, the video data generated by the processors 906*a*-906*n* may be a panoramic video. The video data may be communicated over a network via the communication devices 910. For example, the network may be a bandwidth-constrained network (e.g., a wireless network). The processors 906*a*-906*n* may combine hardware de-warping, intelligent video analytics and/or digital zooming. The processors 906*a*-906*n* may reduce wireless bandwidth consumption when communicating video data. The processors 906*a*-906*n* may increase image resolution within the available bandwidth.

In some embodiments, portions of the panoramic video may be cropped to the size of a particular one of the displays 920*a*-920*n* by the processors 906*a*-906*n* (e.g., portions of the panoramic video outside of the cropped portion may be discarded and/or not displayed). In some embodiments, the panoramic video may be panned in one or more directions to see additional portions of the panoramic video outside of the field of view of the displays 920*a*-920*n*. For example, the panoramic video may comprise a spherical video, a hemi-spherical video, a 360 degree video, a wide angle video, a video having less than a 360 field of view, etc. In some embodiments, the panoramic video may provide coverage for a full 360 degree field of view. In some embodiments, less than a 360 degree view may be captured by the panoramic video (e.g., a 270 degree field of view, a 980 degree field of view, etc.). In some embodiments, each of the lenses 912*a*-912*n* may be used to capture video frames that provide a portion of a field of view that may be stitched together to provide a field of view that is wider than the field of view captured by each individual one of the lenses 912*a*-912*n*. The processors 906*a*-906*n* may be configured to perform video stitching operations to stitch together video frames (e.g., arrange video frames according to position and/or time, reduce parallax effects, reduce distortions, etc.).

In some embodiments, the capture devices 902*a*-902*n* may implement a rolling shutter sensor. Using a rolling shutter sensor, a small amount of time difference may be present between some portions of each video frame. The processors 906*a*-906*n* may be configured to de-warp and/or correct a rolling shutter effect for each video frame.

In some embodiments, the apparatus 900 may further comprise an audio capture device (e.g., a microphone). The audio capture device may capture audio of the environment. The processors 906*a*-906*n* may be configured to synchronize the audio captured with the images captured by the capture devices 902*a*-902*n*.

The processors 906*a*-906*n* may generate output video data and/or video data that may be used internally within the processors 906*a*-906*n*. The signals VOUT_A-VOUT_N may be encoded, cropped, stitched and/or enhanced versions of one or more of the signals FRAMES_A-FRAMES_N. The signals VOUT_A-VOUT_N may be high resolution, digital, encoded, de-warped, stabilized, cropped, blended, stitched and/or rolling shutter effect corrected versions of the signals FRAMES_A-FRAMES_N.

The driver state monitoring system (DSMS) 922 may be configured to monitor a driver of a vehicle. In one example, the DSMS 920 may be configured to determine a direction of a gaze of the driver. The signal DM may be configured to communicate the driver state. In one example, the signal DM may comprise vector coordinates and/or spherical coordinates of the direction of the gaze of the driver.

In the example shown, the DSMS 922 may be a component of the apparatus 900. In some embodiments, the DSMS 922 may be a module of one or more of the co-processors 906*a*-906*n*. In some embodiments, the DSMS 922 may be a component separate from the apparatus 900. Generally, the DSMS 922 may comprise a lens and a capture device. In some embodiments, the DSMS 922 may be configured to receive input from the capture devices 902*a*-902*n* (e.g., the signal FRAMES_A-FRAMES_N). The implementation of the DSMS 922 may be varied according to the design criteria of a particular implementation.

The DSMS 922 may be configured to use computer vision to locate the eyes 304*a*-304*b* in each of the video frames 300*a*-300*c*. In an example, the DSMS 922 may be configured to determine the 3D coordinates of the location of the eyes 304*a*-304*b* with respect to the axis 308. For example, the coordinates may comprise a location with respect to a horizontal axis, a vertical axis and a depth axis (e.g., a location in 3D space). In some embodiments, the capture devices 902*a*-902*n* may implement depth sensing technology (e.g., time of flight) to determine a depth. In some embodiments, the capture devices 902a-902n may be configured as a stereo pair to determine depth information. The coordinates may be determined with respect to a position of the location of the capture devices 902a-902n.

Based on coordinates of the location of the eyes 304a-304b, the DSM 902 may be configured to determine the direction of the right eye 306ra-306rc and the direction of the left eye 306la-306lc in each of the video frames 300a-300c. The direction of the right eye 306ra-306rc and the direction of the left eye 306la-306lc may be determined based on the orientation of the face of the driver 302. In some embodiments, the DSMS 922 may be configured to detect other facial features (e.g., the nose, the mouth, the ears, etc.) to determine which direction the driver 302 is facing. In some embodiments, the DSMS 922 may be configured to determine the direction that the eyes 304a-304b are facing based on the relationship between the location of the eyes 304a-304b. In some embodiments, the DSMS 922 may detect the location of the pupils of the eyes 304a-304b to determine the direction of the right eye 306ra-306rc and the direction of the left eye 306la-306lc.

The DSMS 922 may be configured to compare the directions of the right eye 306ra-306rc determined from each of the video frames 300a-300c. The DSMS 922 may be configured to compare the directions of the left eye 306la-306lc determined from each of the video frames 300a-300c. The comparison may provide multiple data points for accurately determining the direction of the gaze of the driver 302. In the example shown, three different video frames 300a-300c are used. In another example, one video frame may be used. In yet another example, more than three video frames may be used. Generally, more video frames for analysis may provide more data points, which may provide a more accurate result. However, more data may result in increased costs due to more of the capture devices 902a-902n installed. The number of video frames used for comparison to determine the direction of the gaze of the driver 302 may be varied according to the design criteria of a particular implementation.

Once the gaze of the driver 302 is determined by the DSMS 922, the DSM 922 may present the signal DM. The signal DM may be analyzed by the processors 906a-906n. The processors 906a-906n and/or the memory 908 may store information about the interior of the vehicle 202. For example, the information about the interior of the vehicle 202 may provide coordinates of the locations of the displays 920a-920n. The sensors 916 may further provide the signal SEN, which may comprise the distance of seats from the dashboard 214. The sensor fusion module 952 may combine multiple data sources to make inferences about where the driver 302 is located. The processors 906a-906n may determine the location of the driver within the interior of the vehicle 202.

The processors 906a-906n may be configured to map the gaze determined by the DSMS 922 to a location. For example, the information about the interior of the vehicle 202 may be cross-referenced to the gaze of the driver 302. Based on the location of the driver 302, the direction of the gaze of the driver 302 and the configuration of the interior of the vehicle 202 (e.g., prior knowledge of the layout of the interior of the vehicle 202), the processors 906a-906n may determine at what and/or where the driver 302 is looking. In one example, the processors 906a-906n may determine that the driver 302 is looking out of the windshield 212. In another example, the processors 906a-906n may determine that the driver 302 is looking at one of the displays 218a-218n. The processors 906a-906n may be configured to project the direction of the gaze of the driver 302 from the location driver 302 to a target location within and/or outside of the vehicle 202. Using prior knowledge of the interior of the vehicle 202, the processors 906a-906n may infer what the driver 302 is viewing at the target location of the gaze.

The occupant state monitoring system (OSMS) 924 may be configured to monitor occupants of a vehicle 202. In one example, the OSMS 924 may be configured to determine positions and/or physical characteristics of the occupants. The signal OM may be configured to communicate the occupant state.

In the example shown, the OSMS 924 may be a component of the apparatus 900. In some embodiments, the OSMS 924 may be a module of one or more of the co-processors 906a-906n. In some embodiments, the OSM 924 may be a component separate from the apparatus 900. Generally, the OSMS 924 may comprise a lens, a capture device, and a light source. In some embodiments, the OSMS 924 may be configured to receive input from the capture devices 902a-902n (e.g., the signal FRAMES_A-FRAMES_N). The implementation of the OSMS 924 may be varied according to the design criteria of a particular implementation.

In various embodiments, a low light vision functionality is illustrated. In the DMS 104, the low light vision functionality is implemented in a camera comprising a monochrome global shutter CMOS (complementary metal oxide semiconductor) sensor 120 and enabled to provide periodic 940 nm near-infrared (NIR) illumination. In the OMS 106, the low light vision functionality is implemented in a camera comprising an RGBIR rolling shutter CMOS (complementary metal oxide semiconductor) sensor 130 and enabled to provide either periodic 940 nm NIR illumination or continuous 940 nm NIR illumination. As used herein, the term infrared (IR) generally encompasses both NIR (e.g., about 700 nm to about 1000 nm) and longer (e.g., mid- and far-infrared) wavelength light. When a trigger signal is asserted, the global shutter CMOS sensor 120 of the DMS 104 may be activated (e.g., to begin an exposure/integration cycle) and illumination provided by pulsing the infrared light source 122 for a determined period of time synchronized with pulsing the infrared light source 132 within an exposure/integration window of the rolling shutter CMOS sensor 130. By synchronizing the LED flashes 122 and 132, interference between the LED flashes is eliminated. The infrared illumination window is generally synchronized to the exposure/integration window of the rolling shutter CMOS sensor 132 to provide correct lighting for a particular application. In various embodiments, the pulse width of the infrared illumination window may be varied based upon ambient light levels. In a first mode, infrared (IR) light emitting diodes (LEDs) are pulsed to provide the infrared illumination, rather than having the infrared illumination continuously on, which may improve IR LED efficiency, use less power, and reduce instances of overheating. A short pulse width may be used to freeze motion, thus reducing motion blur in each frame. In a second mode, the LEDs of the OMS 106 may be continuously on to simplify timing control of the DMS 104.

The functions illustrated by the diagrams of FIGS. 1-16 may be implemented utilizing one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
    a first image sensor configured to monitor a driver of a vehicle;
    a second image sensor configured to monitor occupants of said vehicle;
    a first near infrared light source associated with said first image sensor;
    a second near infrared light source associated with said second image sensor; and
    a control circuit configured to control said first near infrared light source and said second near infrared light source to prevent interference between the first and the second near infrared light sources affecting images captured by the first and the second image sensors, wherein said control circuit synchronizes flash periods of said first near infrared light source and flash periods of said second near infrared light source such that said flash periods of said first near infrared light source and said flash periods of said second near infrared light source are coextensive and occur within an integration period of all rows of said second image sensor.

2. The apparatus according to claim 1, wherein:
    the first image sensor comprises a monochrome global shutter complementary metal oxide semiconductor (CMOS) sensor; and
    the second image sensor comprises an RGBIR rolling shutter CMOS sensor.

3. The apparatus according to claim 1, wherein:
    the first and the second near infrared light sources comprise one or more light emitting diodes.

4. The apparatus according to claim 3, wherein:
    the first and the second near infrared light sources comprise one or more 940 nm near infrared light emitting diodes.

5. The apparatus according to claim 1, further comprising an image signal processing circuit configured to analyze images captured by the first and the second image sensors.

6. The apparatus according to claim 5, wherein:
    the image signal processing circuit is further configured to generate one or more control signals in response to analyzing the images captured by the first and the second image sensors; and
    one or more systems of said vehicle are controlled in response to the one or more control signals.

7. The apparatus according to claim 1, further comprising:
    a first image signal processing circuit configured to analyze images captured by the first image sensor; and
    a second image signal processing circuit configured to analyze images captured by the second image sensor.

8. The apparatus according to claim 7, wherein:
    the first image signal processing circuit is further configured to generate one or more first control signals in response to analyzing the images captured by the first image sensor;
    the second image signal processing circuit is further configured to generate one or more second control signals in response to analyzing the images captured by the second image sensor;

one or more occupant-related systems of the vehicle are controlled in response to the one or more first control signals; and
one or more driver-related systems of the vehicle are controlled in response to the one or more second control signals.

9. The apparatus according to claim 1, wherein the control circuit is configured to control respective flashes of the first and the second near infrared light sources to illuminate respective environments from which said images are captured.

10. The apparatus according to claim 1, wherein:
in a first mode, the first near infrared light source is configured to generate first respective flashes in response to a first trigger signal and the second near infrared light source is configured to generate second respective flashes in response to a second trigger signal; and
in a second mode, the first near infrared light source is continuously on and the second near infrared light source is configured to generate the second respective flashes in response to the second trigger signal.

11. A method of monitoring a passenger compartment of a vehicle comprising:
monitoring a driver of the vehicle using a first image sensor and an associated first near infrared light source;
monitoring occupants of the vehicle using a second image sensor and an associated second near infrared light source; and
controlling the first near infrared light source and the second near infrared light source to prevent interference between the first and the second near infrared light sources affecting images captured by the first and the second image sensors, by synchronizing flash periods of the first near infrared light source and flash periods of the second near infrared light source such that the flash periods of the first near infrared light source and the flash periods of the second near infrared light source are coextensive and occur within an integration period of all rows of said second image sensor.

12. The method according to claim 11, wherein:
the first image sensor comprises a monochrome global shutter complementary metal oxide semiconductor (CMOS) sensor; and
the second image sensor comprises an RGBIR rolling shutter CMOS sensor.

13. The method according to claim 11, wherein:
the first and the second near infrared light sources comprise one or more light emitting diodes.

14. The method according to claim 13, wherein:
the first and the second near infrared light sources comprise one or more 940 nm near infrared light emitting diodes.

15. The method according to claim 11, further comprising analyzing images captured by the first and the second image sensors using a multi-channel image signal processing circuit.

16. The method according to claim 15, further comprising:
generating one or more control signals in response to analyzing the images captured by the first and the second image sensors; and
controlling one or more systems of the vehicle in response to the one or more control signals.

17. The method according to claim 11, further comprising:
analyzing images captured by the first image sensor using a first image signal processing circuit; and
analyzing images captured by the second image sensor using a second image signal processing circuit.

18. The method according to claim 17, wherein:
generating one or more first control signals in response to analyzing the images captured by the first image sensor;
generating one or more second control signals in response to analyzing the images captured by the second image sensor;
controlling one or more driver-related systems of the vehicle in response to the one or more first control signals; and
controlling one or more occupant-related systems of the vehicle in response to the one or more second control signals.

19. The method according to claim 11, further comprising:
in a first mode, generating first respective flashes using the first near infrared light source in response to a first trigger signal and generating second respective flashes using the second near infrared light source in response to a second trigger signal; and
in a second mode, using the second near infrared light source to continuously generate near infrared illumination and using the first near infrared light source to generate the first respective flashes in response to the first trigger signal.

20. A method of monitoring a passenger compartment of a vehicle comprising:
monitoring a driver of the vehicle using a first image sensor and an associated first light source;
monitoring occupants of the vehicle using a second image sensor and an associated second light source; and
controlling the first light source and the second light source to prevent interference between the first and the second light sources affecting images captured by the first and the second image sensors, wherein
in a first mode, controlling the first light source and the second light source comprises generating a first flash using the first light source in response to a first trigger signal and generating a second flash using the second light source in response to a second trigger signal, such that the first flash and the second flash are generated during an integration period of all rows of the second image sensor, and
in a second mode, controlling the first light source and the second light source comprises using the second light source to continuously generate near infrared illumination and using the first light source to generate a flash in response to the first trigger signal when none of the rows of the second image sensor are in the integration period.

* * * * *